United States Patent [19]

Kiess et al.

[11] 3,819,276

[45] June 25, 1974

[54] DIGITAL DIRECT READING COLORIMETER

[75] Inventors: Raymond W. Kiess; Peter H. Stewart, both of Miami, Fla.

[73] Assignee: The First National Bank of Miami, Miami, Fla.

[22] Filed: Feb. 8, 1972

[21] Appl. No.: 224,457

Related U.S. Application Data

[63] Continuation-in-part of Ser. No. 113,881, Feb. 9, 1971, Pat. No. 3,676,007, which is a continuation-in-part of Ser. No. 692,525, Dec. 21, 1967, Pat. No. 3,561,878.

[52] U.S. Cl.................. 356/184, 250/218, 324/115, 73/64.1, 23/253 R, 356/226, 356/227, 356/201
[51] Int. Cl............................. G01j 3/42, G01j 3/48
[58] Field of Search............................. 356/39–42, 356/180, 224, 226, 227; 250/226, 218; 324/115; 23/230, 292; 73/64.1

[56] References Cited
UNITED STATES PATENTS

| | | | |
|---|---|---|---|
| 3,528,749 | 9/1970 | Bowker.............................. | 356/202 |
| 3,593,568 | 7/1971 | Schmitz........................... | 356/39 X |
| 3,617,885 | 11/1971 | Wheable............................ | 324/115 |
| 3,706,499 | 12/1972 | Rapoza et al...................... | 356/184 |

OTHER PUBLICATIONS

Enke, Analytical Chemistry, Vol. 43, No. 1, Jan. 1971, pp. 69A–73A, 75A–78A and 80A.

Willard et al., Instrumental Metals of Analysis, D. Von Nostrand, New York (1965), Title page plus pp. 92–93.

*Primary Examiner*—Ronald L. Wibert
*Assistant Examiner*—R. J. Webster
*Attorney, Agent, or Firm*—Fisher, Christen, Sabol & George H. Mitchell, Jr.

[57] ABSTRACT

A combined blood constituent and prothrombin time analyzer is provided in which a plurality of removable and replaceable circuit modules are utilized to program the analyzer for appropriate light wavelength, reagent blank offset, scale factors and calibration parameters and which is self referencing to predetermined standards such that the results derived are all normalized for readout on a common digital readout device. The entire analyzer is contained in a compact console which includes controlled incubated storage for blood test samples together with insertion cavities for both constituent concentration and prothrombin time analysis. The results of each analysis are so normalized by the blood analyzer that a common digital counter can be used to convert these results to a numerical readout presentable on a common readout device and said results are substantially instantaneously displayed subsequent to initiation of any given test in the analyzer.

20 Claims, 36 Drawing Figures

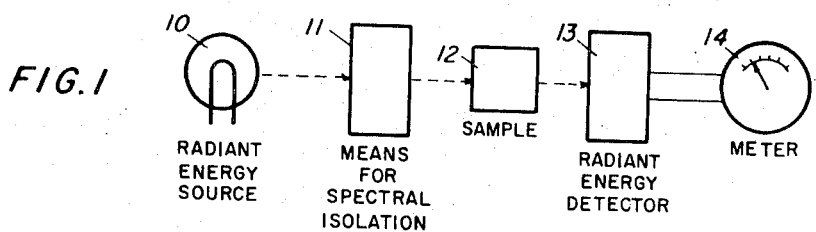
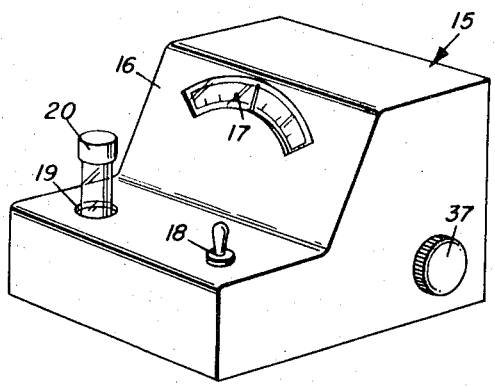
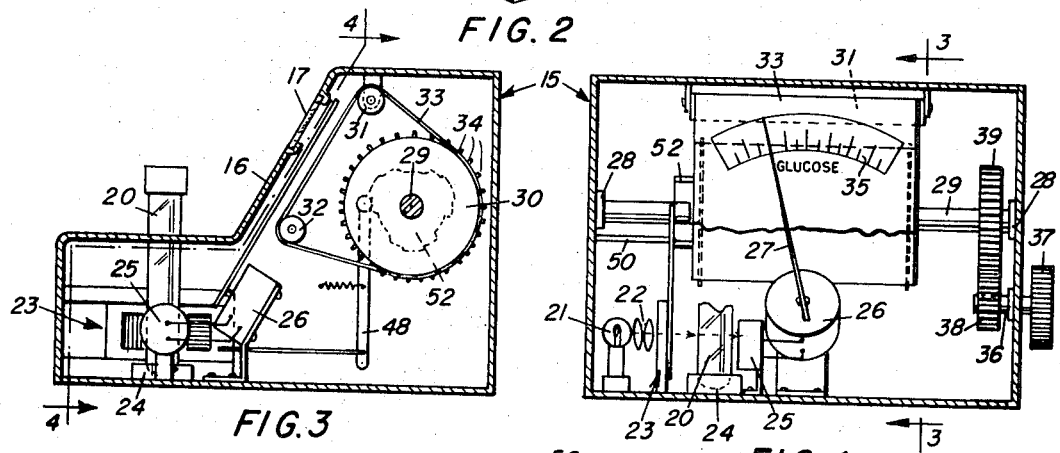
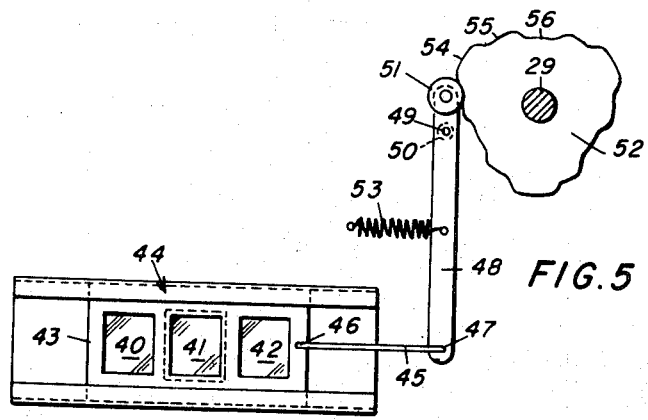

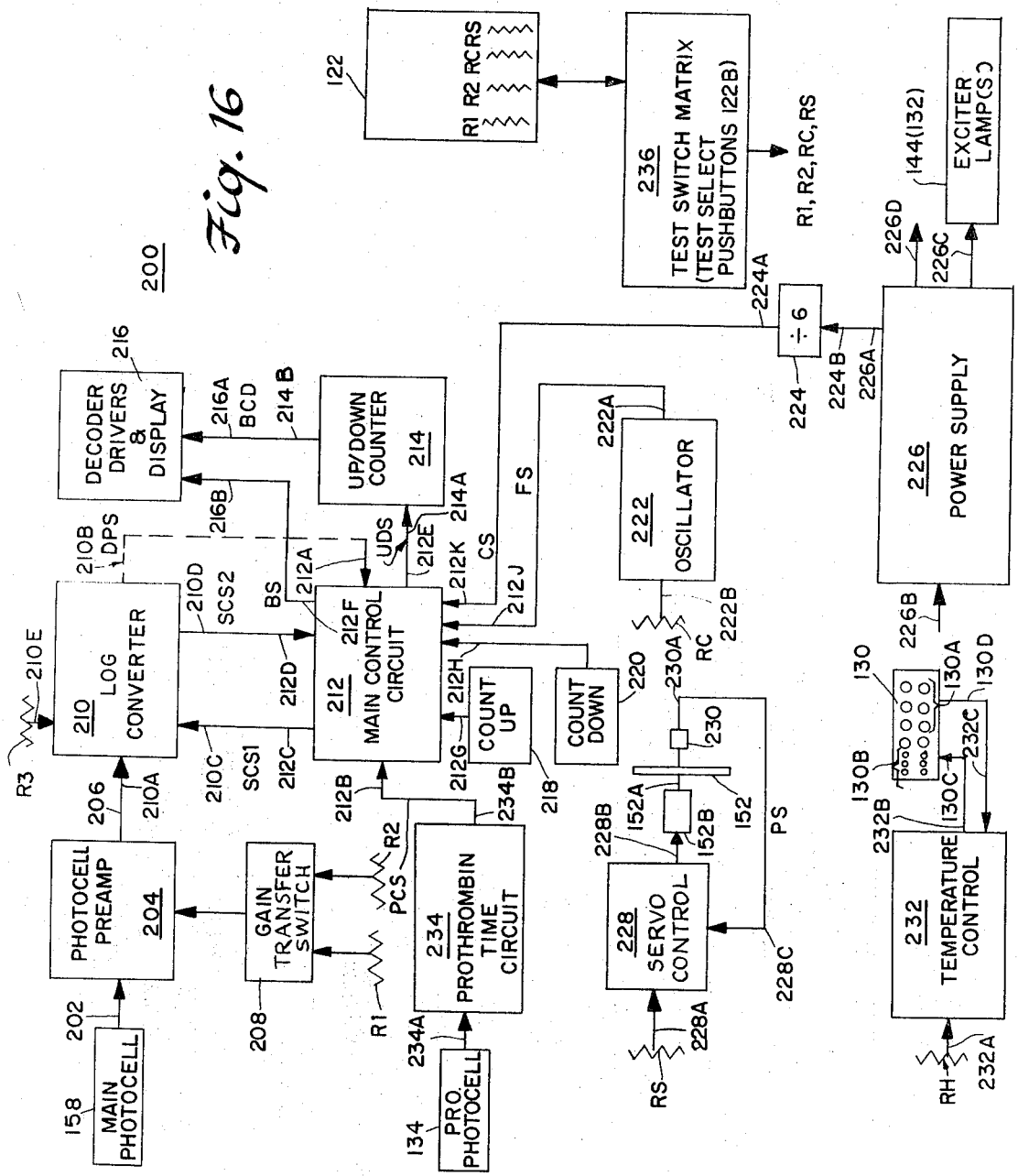

1. WHERE $E\lambda = e_o(\lambda \text{ CUT OFF})$
2. REAGENT BLANK INTERCEPT ($C_v = 0$) DUE TO OFFSET
3. DISTILLED WATER BLANK INTERCEPT – NO OFFSET

ALL PARAMETER VALUES ARE MERELY FOR THE SAKE OF EXAMPLE.

DIGITAL DIRECT READING COLORIMETER

This application is a continuation-in-part of copending application Ser. No. 113,881, filed Feb. 9, 1971 of Raymond W. Kiess, now U.S. Pat. No. 3,676,007, which is in turn a continuation-in-part of Ser. No. 692,525, filed Dec. 21, 1967, now U.S. Pat. No. 3,561,878 of Raymond W. Kiess, patented Feb. 9, 1971.

This invention relates to the chemical quantitation or quantitative analysis of certain constituents present in blood, urine and other body fluids that are of significant interest to the medical and health professions, for the detection of pathological conditions of the human or animal bodies and also as a guide to dictate therapy as well as serving as a parameter to judge prognostically as to the state of health or morbidity of the organism.

Procedural simplification from a viewpoint of chemical analysis, as well as instrumentation, has resulted as the development of the state of the art has progressed.

Simply stated, biochemical colorimetry is based upon the measurement of color developed by certain chemical reactions, the color developed usually being stoichiometrically related to the concentration of the constituent being analyzed.

In the early years of biological or clinical chemistry, the colors developed in a chemical reaction were compared visually with those of known concentrations. Thus, the unknown constituents could be approximated and the results could even be interpolated in certain instances.

The twin-cup type visual colorimeter followed and a split-field comparator was used to indicate an approximation of color equilibrium, the concentration being related to the relative depts of immersion of the optical probes.

Later, a filter photometer evolved which used a filter to isolate the useable and desired portion of the spectrum, and later prisms, diffraction gratings and interference filters were introduced, all of which greatly increased the sensitivity, specificity, reproducibility, and accuracy of the procedure. It also removed the human element from matching colors visually.

Other instruments also evolved utilizing the ultraviolet and infra-red portions of the spectrum.

As the state of the art progressed, different chemical formulations of reagents which were more specific and possed more desirable stability characteristics were developed. Until this stage was reached, different batches of reagents had to be tested and graphs constructed to relate color development to terms of concentration.

The art has now evolved to the point that colorimeter of spectrophotometer scales can be directly calibrated to be read in terms of concentration, rather than to take a reading from the meter and refer to a calibration table, or graph, to relate this reading to meaningful terms of concentration. Methods have also been introduced whereby a single calibrated meter with a keying mechanism can be inserted in a colorimeter, thus making certain that the appropriate filter is properly positioned in the light beam or, several scales can be inscribed on the meter face with no provision made for the changing of filters.

It is quite apparent that the first of the two approaches mentioned in the previous paragraph has the limitation of cost because a separate meter movement must be used for each particular test, as well as being awkward and cumbersome and, that the latter approach is limited because of physical limitations as to the number of arcs capable of being inscribed thereon are limited to four or five, and the lack of any provision for selecting the proper filter.

The present invention relates to a direct reading colorimeter and describes apparatus that will allow the selection of a suitable scale in terms of the constituent to be quantitated, as well as the selection of an appropriate filter, in a simple and reliable manner so as to leave no opportunity for error.

This invention further relates to colorimetric body fluid constituent concentration analyzing means in combination with blood prothrombin test analyzing means and more particularly, to such analyzing means of the direct digital reading, self-referencing photometric type.

It is an object of this invention to provide a new and novel colorimetric blood analyzer and prothrombin analyzer having optimum test accuracy heretofore unattainable in the art.

It is another object of the present invention to provide a new and novel colorimetric blood analyzer and prothrombin analyzer which is readily adapted to relatively low cost manually processed instruments for use in doctor's offices and small volume applications in laboratories and hospitals.

Still another object of the present invention is to provide a new and novel colorimetric blood analyzer and prothrombin analyzer comprised of a plurality of interchangeable modules, each such module being adapted for a specific blood test, whereby a particular instrument embodying the invention can be selectively adapted to any given group of such tests.

Still another object of the present invention is to provide a new and novel colorimetric blood analyzer and prothrombin analyzer comprised of a plurality of interchangeable modules, each such module being adapted for a specific blood test, whereby a particular instrument embodying the invention can be selectively adapted to any given group of such tests; and wherein each said module programs the said instrument for the appropriate light wavelength, reagent blank offset, scale factor and calibration parameters to allow direct display of the desired blood constituent concentration units being tested on a common readout instrumentality in a numerical or digital format.

Yet another object of the present invention is to provide a new and novel colorimetric blood analyzer and prothrombin analyzer which is self-referencing for each and every constituent test performed thereby.

These and other objects of the present invention will become more fully apparent with reference to the following specification and drawings, which relate to a preferred embodiment of the present invention together with those embodiments from the above-identified copending application and patent of Raymond W. Kiess by way of background for the invention.

In the drawings:

FIG. 1 is a diagrammatic representation of the basic components of a photometer spectrophotometer; and FIG. 2 is an isometric view of a preferred form of colorimeter construction in accordance with the teachings of the present invention;

FIG. 3 is a cross-sectional elevation of the device of FIG. 2 taken on the line 3 — 3 of FIG. 4.

FIG. 4 is a cross-section taken on the line 4 — 4 of FIG. 3;

FIG. 5 is a fragmentary view of an enlarged scale of the camming mechanism use for shifting the filter means;

FIG. 16 is a block diagram of the normaling testing system contained in the test console of FIGS. 13 and 14;

Figure 6:
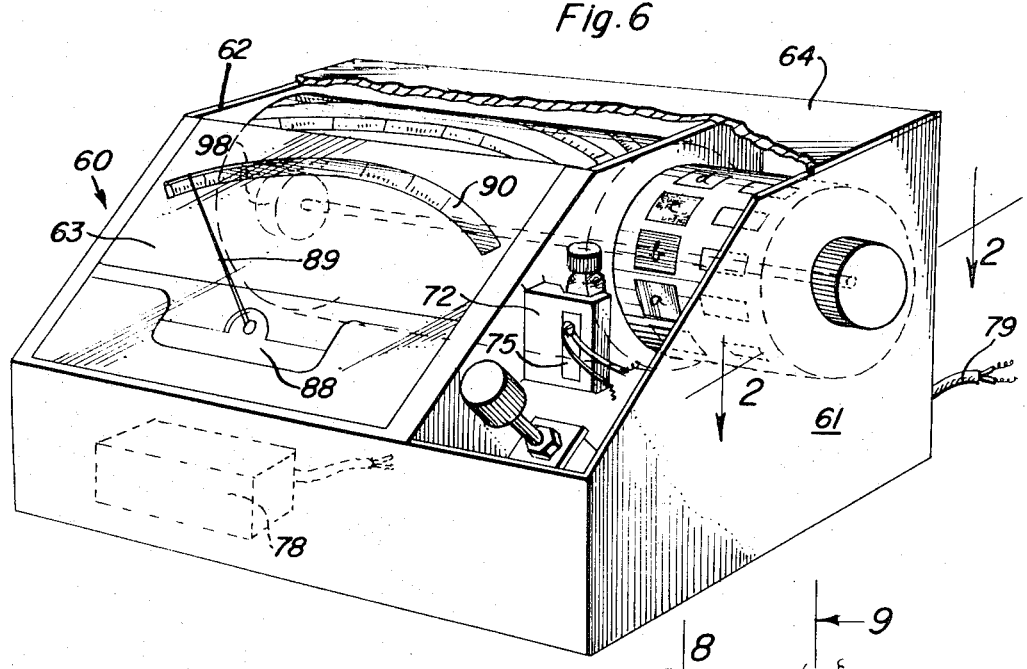
FIG. 6 is a perspective of another embodiment of the invention as described in the copending application of Raymond W. Kiess.
Figure 7:
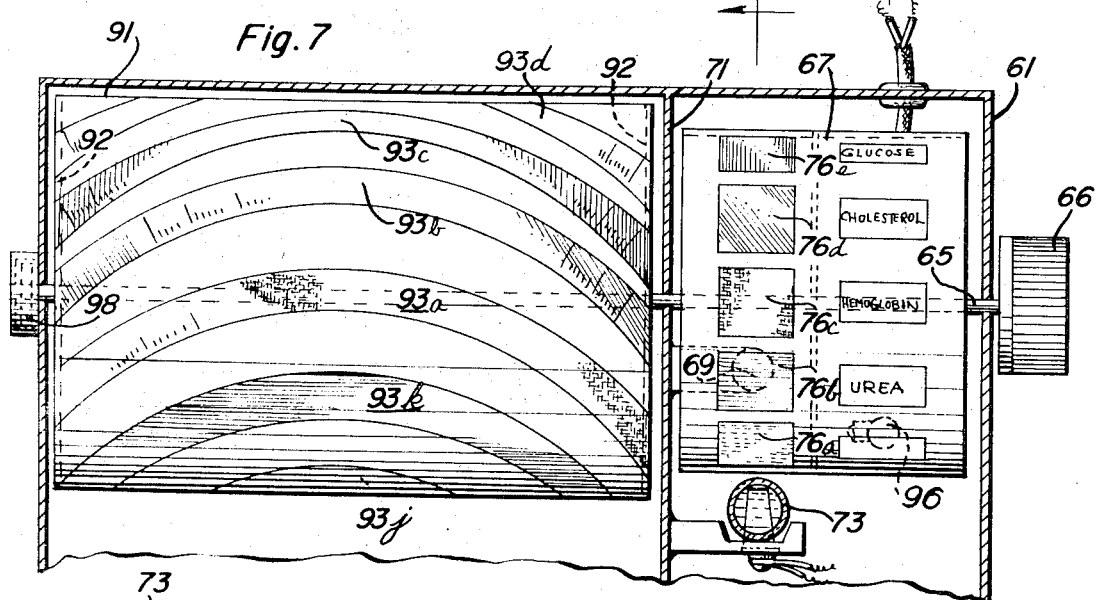
FIG. 7 is a front plan view of the embodiment of FIG. 6, with the cover broken away, showing the coordinated assembly of scales, filters and indicating means thereof.

FIG. 1 represents, in diagrammatic form, the usual arrangement of components which comprise a colorimeter for spectral analysis of a liquid sample, in which numeral 10 indicates generally a source of radiant energy such as an electric lightbulb, numeral 11 indicates a filter for isolating portions of the visible spectrum which is placed in the path of light from the source so as to pass through a sample of liquid to be analyzed, indicated by numeral 12, after which the light impinges upon a radiant energy detector, or transducer means, indicated generally by numeral 13, capable of transforming received light energy into electrical energy in proportion to the intensity of radiant energy impinging upon the detector, this intensity being noted in terms of electrical energy by means such as the meter, indicated generally by numeral 14.

The table set forth below gives an idea of the numerous tests which may be conducted upon liquid samples wherein it is preferable in each case to employ a radiant energy source having a specific optimum wavelength for each test.

This table shows the numerous constituents that may be measured, the optimum wavelength of the filler to be used, and the procedural references. This list is shown for reference only and does not mean to infer that either the procedural reference and wavelength indicated or test for constituents are a limiting factor, as other suitable test procedures and associated wavelengths could be interchanged or different constituents altogether could be quantitated without detracting in any manner from either the uniqueness or value of this invention.

| Constituent | Optimum Wavelength for quantitation, mu. | Procedural reference |
| --- | --- | --- |
| Serum glutamic oxalacetic transaminase | 505 | Frankel et al. |
| Serum glutamic pyruvic transaminase | 505 | Do. |
| Hemoglobin | 540 | Drabkin |
| Urea nitrogen | 540 | Berthelot |
| Cholesterol | 640 | Liebermann-Burchardt |
| Glucose | 540 | Washko, Rice |
| Bilirubin | 540 | Malloy, Evelyn |
| Alkaline phosphatase | 660 | Bodansky |
| Acid phosphatase | 660 | Do. |
| Icterus index | 420 | Meulengracht |
| Thymol turbidity | 640 | Kunkel, Hoagland |
| Calcium | 550 | Connerty, Riggs |
| Inorganic phosphorus | 660 | Fiske, Subba Row |
| Protein | 540 | Biuret |
| Albumin | 615 | Rodkey |
| Zinc sulfate turbidity | 650 | Kunkel |
| Uric acid | 660 | Henry, Caraway |
| Lipids | 640 | Kunkel, Ehrens, Eisenmenger |

Moreover, while the foregoing table indicates that there are optimum values for the light waves used in each of the tests to be conducted, the usual colorimeter is provided with only a single filter designed to pass light rays having a broad spectrum of frequency and thus it will be realized that, even if a number of interpolation tables are provided (based on the known frequency of the single filter) a sacrifice of accuracy will result. On the other hand, even if the colorimeter is provided with several interchangeable filters, a separate interpolation table is required for each test.

Thus it is one purpose of the present invention to provide, not only a means for supplying a plurality of calibrated scales for a meter to enable the percentage of constituent substances to be read directly from the deflection of the meter pointer, but also to provide a plurality of filter means to enable tests for each constituent material to be conducted with a light source having the optimum wavelength for that material in accordance with the procedure appropriate for each analysis.

Therefore, a preferred embodiment of the invention comprises a housing, indicated generally by numeral 15 in FIG. 2, having a front panel 16 provided with a transparent window 17, a switch 18 for controlling the supply of electricity to the device and a suitable opening 19 to permit the insertion therein of a cuvette 20 containing a sample (not shown) of a liquid to be analyzed. Within the housing there is provided a suitable source of radiant energy, such as a small lightbulb 21, provided with the usual condensing lens system 22 which directs the light from the lightbulb through a filter means, identified generally by numeral 23 and shown in an enlarged scale in FIG. 5. A support 24 for the cuvette enables the cuvette to be placed in the path of light rays from the filter means 23 so that they will impinge on the radiant energy detector 25, which may be of any standard type such as a photocell, or other similar device which transforms radiant energy into electrical energy and is connected in a circuit with the meter 26 having a movable pointer, or other indicating device 27.

Mounted upon a suitable support 28 within the housing is a horizontally positioned shaft 29 which carries a pair of axially spaced sprocket wheels 30. Also mounted within the housing are a pair of horizontally mounted elongated rollers 31 and 32 positioned in such a manner as to display an endless strip of flexible sheet material 33, the margins of which are perforated so as to engage with the teeth 34 of the sprockets 30. This sheet, as will be seen in FIG. 4, has upon its surface a plurality of indicia, such as the individually calibrated scales for the different analytical tests. For example, in FIG. 4, there is shown the appropriate scale 35 for testing glucose. Other scales for the test, as exemplified in the table above, are imprinted on other portions of the sheet (not shown) and these scales may be brought into position to be viewed through the window 17 in conjunction with the pointer 27 by rotation of the sprockets 30. Means is provided for changing the position of this sheet manually by the provision of a stub shaft 36 extending through one side of the housing and having an externally mounted actuating knob 37 attached thereto. The stub shaft also carries a pinion 38 in engagement with a gear 39 on the shaft 29.

The filter means 23, as viewed in FIG. 3, is shown in enlarged detail in FIG. 5 and in a preferred form comprises a series of filters 40, 41 and 42, each having a particular wave length isolating characteristic, mounted in side by side relationship in a supporting strip of material 43, which is mounted for horizontal sliding movement in a slideway 44 in such a manner that the respective filters may be selectively positioned in the path of light from the source 21 which passes through the cuvette 20 to the radiation detector 25.

The position of the filters may be controlled by means of linkage means including an arm 45 having a pivotal connection 46 at one end joining it to the support for the filters and pivotally connected at 47 to one end of another arm 48, this arm being mounted on a medial pivot 48 carried by a supporting bracket 50 attached to the interior of the housing. The other end of arm 48 is provided with a roller 51 which acts as a cam follower in operative engagement with the peripheral surface of a rotatable cam 52 fixed to the shaft 29. A coil spring 53 connected between the arm and the housing urges the roller into an engagement with the cam.

It will be noted that the cam is provided with a series of dwells 54, 55 and 56, for example, each of these dwells comprises surfaces which are concentric with the axis of rotation of the cam but spaced from the axis at differing radial distances and, as a result, rotation of the cam will position different ones of the filters 40, 41 and 42 in the light path depending upon which of the dwells on the cam is in engagement with the cam follower 51. Furthermore, it will also be apparent that rotation of the shaft 29 and the sprocket wheels 30 will move the sheet 33 for the purposes of positioning the appropriate scale 35 adjacent the pointer 27. Thus, when it is desired to conduct a specific colorimetric analysis of a liquid the positioning of the desired scale in the window 17 of the housing will at the same time bring into position in the light path the appropriate filter for carrying out the test in question.

In the form of the invention shown in FIGS. 6 – 10, the component parts are contained within a cabinet, indicated generally by numeral 60, having a pair of end walls 61 and 62, a sloping front panel 63 and a flat top 64. The end walls support a horizontal shaft 65 for rotational movement under control of a manually operable knob 66 projecting exteriorly of one side of the cabinet.

Figure 9:
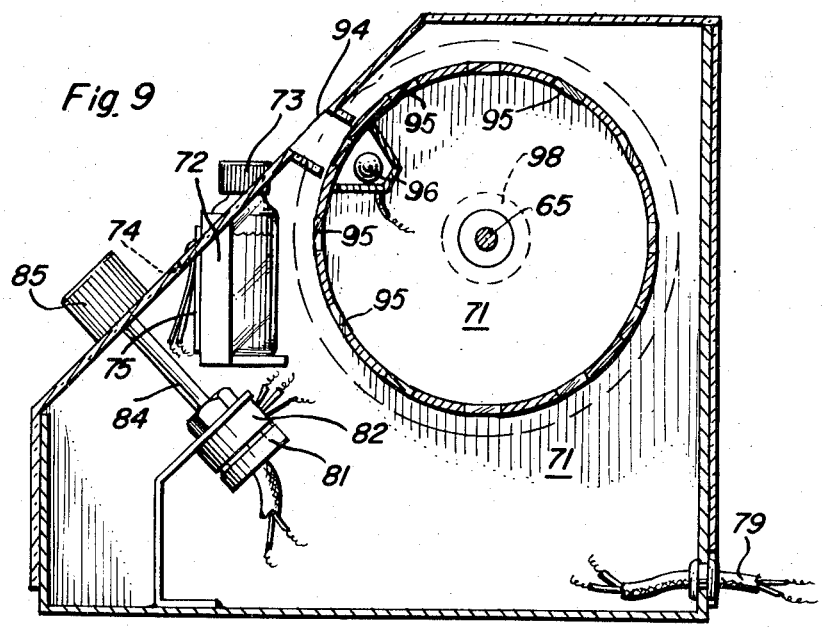
FIG. 9 is a cross-section taken along line 9 — 9 of FIG. 7.
Figure 8:
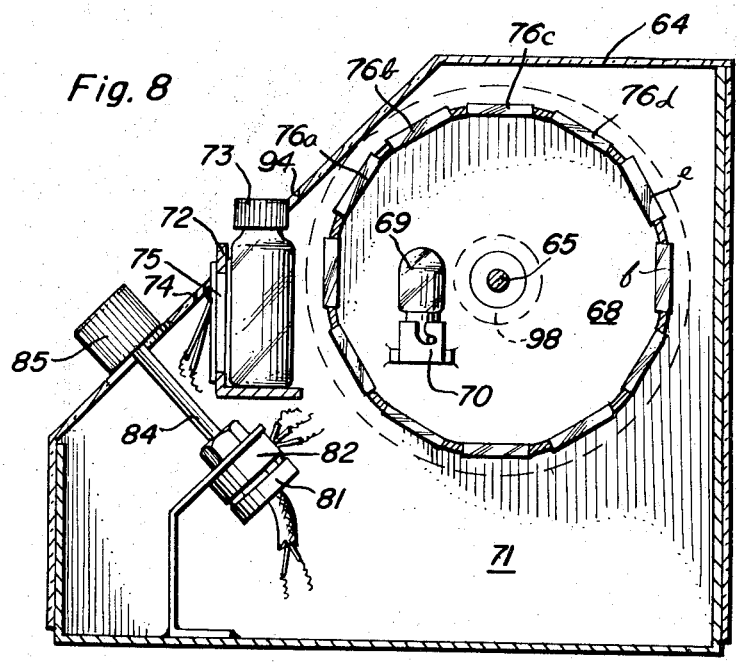
FIG. 8 is a cross-section taken along line 8 — 8 of FIG. 7.

This shaft supports an assembly of scales, filters and indicating means, one portion of which is represented by a drum shaped element 67 which may be concentrically supported on the right hand end of shaft 65 by means of a centrally disposed radial web 68 (see FIG. 9). Within the drum on the left side, as seen in FIG. 8, there is a radiant energy source, such as an incandescent electric lamp 69, removably mounted in a socket 70 attached to an inner transverse wall 71. This wall also supports a holder 72 to removably support a cuvette 73 containing a specimen of liquid to be analyzed in an upright position and which can be inserted or removed through an opening 74 in the front panel. The holder 72 also supports a photocell 75 positioned on the side of the cuvette away from the lamp 69 so that the cuvette will be positioned in the path of light from the lamp. In addition, this portion of the drum 67 is also provided with a series of circumferentially arranged openings each of which contains a light filter, identified by numerals 76a, 76b, 76c, 77e, etc. Each of these filters is desired to isolate a portion of the radiant energy spectrum which is received from source 69 and to permit that portion of the spectrum to pass on through the cuvette and its contents and to the photocell 75 which is appropriate to the test being conducted.

Figure 10:
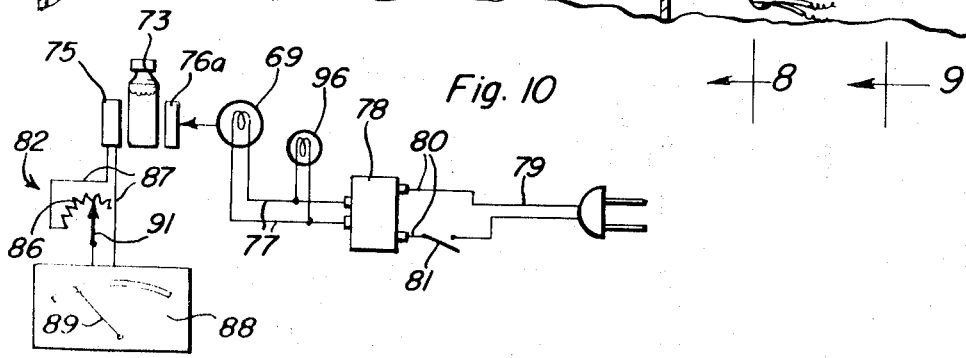
FIG. 10 is a schematic circuit diagram for the embodiment of FIG. 6 - 9.

As shown schematically in the wiring diagram of FIG. 10, the lamp 69 may be energized by means of wires 77 connected between the socket 70 and a step-down transformer 78 contained within the cabinet the primary of this transformer being connected with a line cord 79 by means of wires 80, one of which may be controlled by a switch 81 which is combined in accordance with conventional practice with a potentiometer 81 mounted on bracket 83 attached to the bottom of cabinet 60 and controlled by shaft 84 which projects through an opening in the panel 63 and terminates in a knob 85. Obviously, this is a matter of convenience and the switch could be separately controlled.

The potentiometer includes a resistance 86 which is connected by wires 87 with the photocell 75, one of these wires being also connected to one side of a meter 88 provided with a movable indicating device such as the pointer 89. The meter is secured to the underside of panel 63 at the left side of the cabinet so that the indicating end of the pointer may be visible through a transparent semi-circular window 90 in the panel 63 and the other side of the meter is connected by a wire 91 to the movable contact (not shown) of potentiometer 82.

Below the window 90 there is a circular drum 91 supported on shaft 65 by means of transverse end webs 92 and appearing on the surface of the drum are a plurality of scales 93a, 93b, 93c, 93j and 93k. The number of scales corresponds to the number of filters on drum 67 but the corresponding scale will be angularly offset for reasons which will be self-evident when it is realized that each scale is calibrated to indicate either a percentage, or finite amount, of a material present in a specimen being examined by light passing through a particular filter. Since the light path from source 69 lies in a horizontal plane, while the corresponding scale is being viewed through the window 90 from an angularly upwardly directed position normal to panel 63, the scales are angularly displaced by the amount of tilt of the panel.

The front panel is also provided with another rectangular transparent window 94 at the right hand side through which the right hand side of drum 67 may be viewed, this portion of the drum being provided with a series of indicia 95a, 95b, 95c, 95d, 95e, etc. bearing the names of the individual tests capable of being connected by corresponding combinations of scales 95 and filters 76. Since these indicia are also viewed from an upwardly angularly directed position through window 94 the indicia for any given test will be generally positioned circumferentially on drum 67 in alignment with the corresponding scale on drum 91 but angularly offset with respect to the corresponding filter on drum 67. In addition, while it is not an essential feature, it is considered desirable that the drum be provided with a series of circumferentially arranged openings and that the indicia be translucent and arranged in these openings for illumination by a lamp 96 mounted in socket 97 mounted on end wall 61 within the interior of drum 67. The lamp can also be supplied from the secondary of transformer 78 under control of switch 81, as shown in FIG. 10. A still further refinement of the arrangement consists in color coding the scales and indicators so that the indicia will appear against a background of similar colors in each of the windows 90 and 94 and also to provide an additional visual indication of the test being performed.

In operation, the knob 85 will be turned to close the switch 81 to energize both lamps 69 and 96. By observing the indicators through window 94 the knob 66 is rotated until the indicator for the desired test is brought into view, which action simultaneously and automatically brings the correct scale into view in window 90 and places the correct filter into the path of radiant energy emitted by lamp 69. In order to ensure that the assembly will remain in position until changed a detent mechanism 98, of conventional construction, can be connected with the shaft 65 to frictionally hold it in any of the selected positions. When the appropriate test has been selected, the potentiometer can be adjusted by turning knob 85 to obtain a zero reading of the pointer 91 on the appropriate scale and when the cuvette 73 is inserted into the holder the change in the light transmission through the specimen contained therein will be recorded by the position of the pointer on the scale which is calibrated either in terms of a percentage, or in absolute units of the material being investigated.

Both of the foregoing embodiments provide means such as change of scale calibration, and manual zero settings in coordination with selected filter changes to effect normalization of the readout to any given test being performed thereby.

The following preferred embodiment includes electronic means to automatically normalize the entire testing system and its common readout means not only to a multiplicity of constituent concentration tests but to a prothrombin time test as well.

THE PRESENT EMBODIMENT

While adaptable as a constituent concentration analyzer for various body fluids, the present embodiments of this invention will be described as blood constituent concentration and prothrombin analyzers which significantly reduce errors commonly encountered with prior art instruments.

The invention includes a console with a plurality of specific constituent test circuits each embodied as a replaceable module for selective insertion or interchangeability in a new and novel console configuration.

These consoles are particularly useful in doctor's offices and for relatively low volume applications in laboratories and hospitals.

Multiple blood test selections are provided by selective electric switching of circuit parameters specifically adapted for a given test and contained in a given test module for that purpose. Since these modules are interchangeable in the test instrument console, the selection of any group of tests can be readily made by merely placing the selected test modules in the test instrument console.

Each test function module, by means of the preselected circuit parameters therein, normalizes the test instrument console, and its single digital readout instrument, to the appropriate factors of the intended colorimetric or prothrombin analysis.

In the case of colorimetric constituent analysis, the given test module defines the appropriate light wavelength, reagent blank offset, scale factor and calibration parameters to allow direct display of concentration units. This permits the use of a single numerical or digital read-out device for the entire group of preselected tests to be performed by the test instrument console.

Self-referencing means are provided by the inclusion of reference parameters in the common test control circuitry of the console such that for each constituent analysis or test, a reference measurement is made and the reference value is then electronically subtracted from the value of the unknown measured, thereby deriving a constituent concentration value for each given test.

In this manner, the unknown is always measured relative to a correlated reference quantity.

The console includes a prothrombin timer which is coordinated with common control circuits in the instrument console such that the same numerical or digital read-out device can be utilized for this test as well as the constituent concentration tests.

A cuvette well for fluid samples together with an incubating means are also included in the test instrument module, thereby providing a compact, self-contained laboratory test facility for blood constituent concentration and prothrombin analysis.

Figure 11:
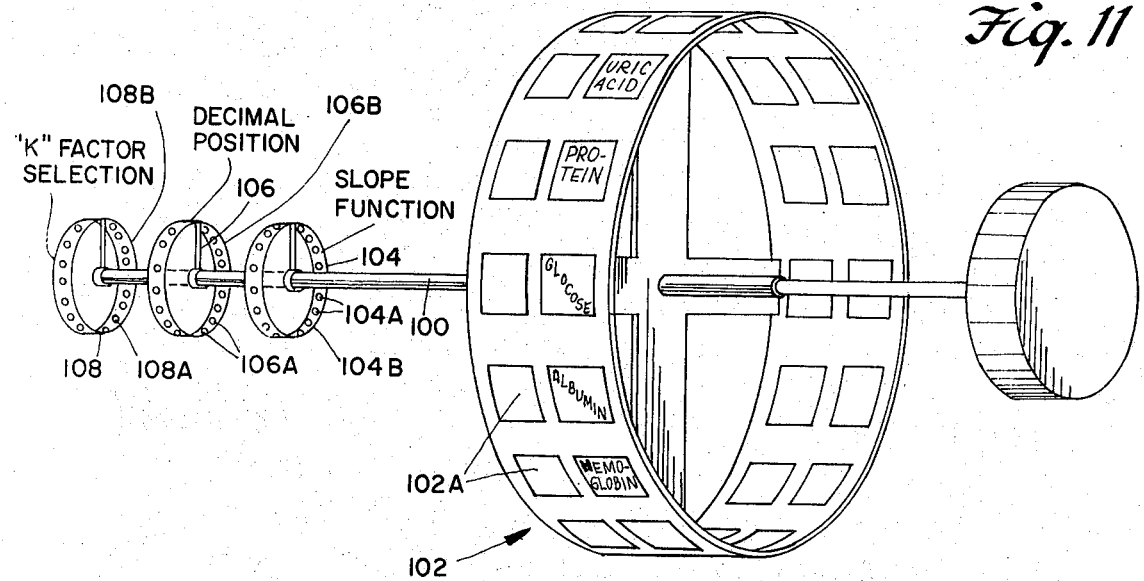
FIG. 11 is perspective of another embodiment of the present invention in which each filter is coordinated with a plurality of circuit means adapted to normalize a single readout means to the units of each test being performed.
Figure 12:
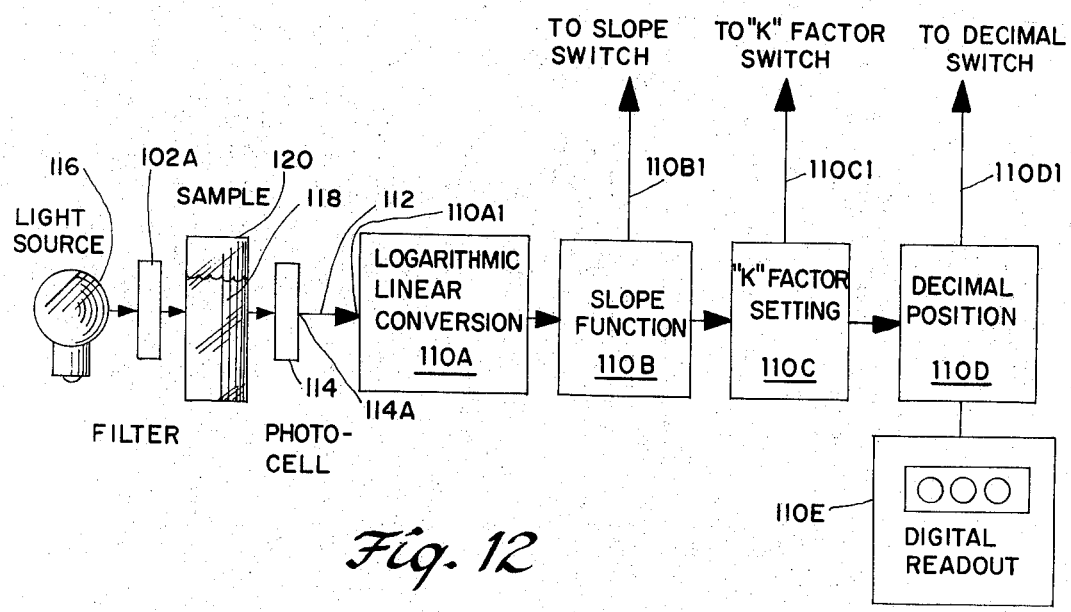
FIG. 12 is a block diagram of a normalizing circuit means associated with the structure of FIG. 11.

Referring in detail to the drawings and with particular reference to FIGS. 11 and 12, a simplified embodiment of a blood constituent concentration analyzer is shown in which some of the features of the ganged control shaft and filter wheel of the previous embodiments are illustrated together with common control circuitry cooperating with ganged external parametric constraints controlled by the filter wheel control shaft.

While this is an operative embodiment in and of itself, its description at this point will also serve as a transitional explanation between the previous embodiments and the preferred interchangeable module test console to be hereinafter more fully described.

As shown in FIG. 11, a common control shaft 100 is provided on which are mounted for rotation therewith a filter wheel 102, a slope function selector switch 104, a decimal position selector switch 106 and a K-factor selector switch 108. Each of these switches 104 – 108 are keyed to include, selectively, external parameters in the common control and calculating circuits 110 (FIG. 12) which are correllated with the filters 102A on the filter wheel 102 to provide normalizing constraints upon the said control and calculating circuits 110 such that the common digital display means 110E associated therewith can provide a readout for any given constituent concentration analysis selected by rotation of the common control shaft 100.

The control and calculating circuits 110, are shown as including a linear-to-logarithmic converter circuit 110A, a slope function circuit 110B, a "K" factor setting circuit 110C, a decimal position circuit 110D and a digital display readout 110E.

These circuits are connected such that the output of the linear-to-logarithmic conversion circuit 110A is applied to the input of the slope function circuit 110B; the output of the slope function circuit 110B is applied to the input of the "K" factor setting circuit 110C; the output of the "K" factor setting circuit 110C is applied to the input of the decimal position circuit 110D; and the output of the decimal position circuit 110D is applied to the input of the digital display readout 110E.

The input 110A1 of the linear-to-logarithmic conversion circuit 110A is connected through a circuit lead 112 with the output 114A of a photoelectric detector 114, the latter having the light from an irradiated sample 118 in a test cuvette 120 as an optical input thereto.

The irradiated sample 118 and its cuvette 120 are irradiated from a standard light source 116 through a test filter 102A selected by positioning the filter wheel 102 with respect to the light source 116.

When the filter wheel 102 is positioned, the common control shaft 100 constrains the selector switches to corresponding positions such that the proper external parameters will be switched into the respectively associated control circuits 110B – 110D, thereby normalizing those circuits to the parameters of the test being performed.

The slope function selector switch 104 is shown as a rotating contact arm selectively engaging fixed contacts 104A on a circuit disc 148B or the like, each such contact 104A schematically representing a circuit connection which switches an appropriate normalizing external reference parameter into the slope function circuit 110B. This circuit is for the purpose of determining the algebraic sign of the slope function generated during a given test by the linear-to-logarithmic conversion circuit 110A as will be more fully described hereinafter.

The decimal position selector switch 106 is shown as a rotating contact arm selectively engaging fixed contacts 106A on a circuit disk 106B or the like, each such contact 106A schematically representing a circuit connection which switches an appropriate normalizing reference parameter into the decimal position circuit 110D.

The "K" factor selection switch 108 is shown as a rotating contact arm selectively engaging fixed contacts 108A on a circuit disk 108B or the like, each such contact 108A schematically representing a circuit connection which switches an appropriate normalizing reference parameter into the "K" factor setting circuit 110C, the latter acting to provide a normalized analog-to-digital conversion of the slope function generated in the logarithmic converter 110A.

In other words, the "K" factor acts as a gain or proportioning parameter to normalize the magnitude of the resulting output of the circuit 110C to the proper range for the common digital readout device 110E, the latter being shown as including three significant digits in its readout format, with an appropriate decimal point position constraint imposed thereon by the decimal point position circuit 110D.

In this regard, normalizing input circuit connections 110B1, 110C1 and 110D1 are provided, respectively, for the slope function circuit 110B, "K" factor circuit 110C and decimal position 110D to which the selector switches 104, 108 and 106 are respectively connected by appropriate circuit means (not shown).

THE MODULAR TEST CONSOLE

Referring now to FIGS. 13, 14, 15A and 15B, a modular test console 122 of the present invention is shown, together with an individual module 122A which is shown in FIG. 15 removed from the console 122.

The test modules 122A are shown as arranged in columns in the upper face of a console housing 124. In the particular embodiment shown there are 16 test function modules 122A arranged in columns of eight modules together with an incubator temperature control module 126 at the head of one column of the modules 122A and a prothrombin time test module 128 located at the adjacent end of the other column of test functions modules 122A.

Each of the test function modules is positioned adjacent a respective test energizing push-button switch 122B, a plurality of such switches 122B being arranged in corresponding columns of eight adjacent each of the test function modules 122A. Thus, each test function module 122A has a respectively associated test initiating push-button switch 122B positioned immediately adjacent thereto.

Positioned adjacent the right hand column of test function modules 122A is an incubator block 130 having a plurality of cylindrical cavities 130A therein for receiving cuvettes filled with samples to be tested. These cuvettes are like the previously disclosed cuvettes 120 holding the test samples 118 as previously described in relation to FIG. 12.

The incubator block 130 comprises a block of anodized aluminum or the like which, in conjunction with the incubator temperature control module 126, is designed to maintain the test samples and various cuvettes containing same at a temperature of 37°C. This incubator block 130, as shown, has 12 of the cuvette warming cavities 130A therein and an additional number of cavities 130B of smaller diameter, shown to be six in number in this embodiment, for the purpose of incubating prothrombin test cuvettes, the latter being similar to those used for the constituent concentration test samples but of a smaller diameter.

At the uppermost end of the incubator block 130 is a prothrombin test cavity 130C which constitutes the seventh cavity adapted to receive prothrombin test cuvettes, this cavity being so designed as to be opened on one side of irradiation from a prothrombin test exciter lamp 132 and on the other side to be in optical communication with a prothrombin test photocell detector 134 and associated prothrombin test optical filter 136. This group of components is arranged such that the light from the exciter lamp 132 passes through the prothrombin test cavity 130C and the test cuvette and sample contained therein and thence proceeds to pass through the prothrombin test filter 136 to the input of the prothrombin photocell detector 134 which, together with appropriate circuitry to be described more fully hereinafter is constrained to respond to the light passing through the prothrombin test sample.

At the uppermost end of the test module console 122, located between the incubator temperature control module 126 and the prothrombin time module 128 is a digital readout means 138 which is similar to the digital display device 110E previously described in connection with FIG. 12.

Figure 13:
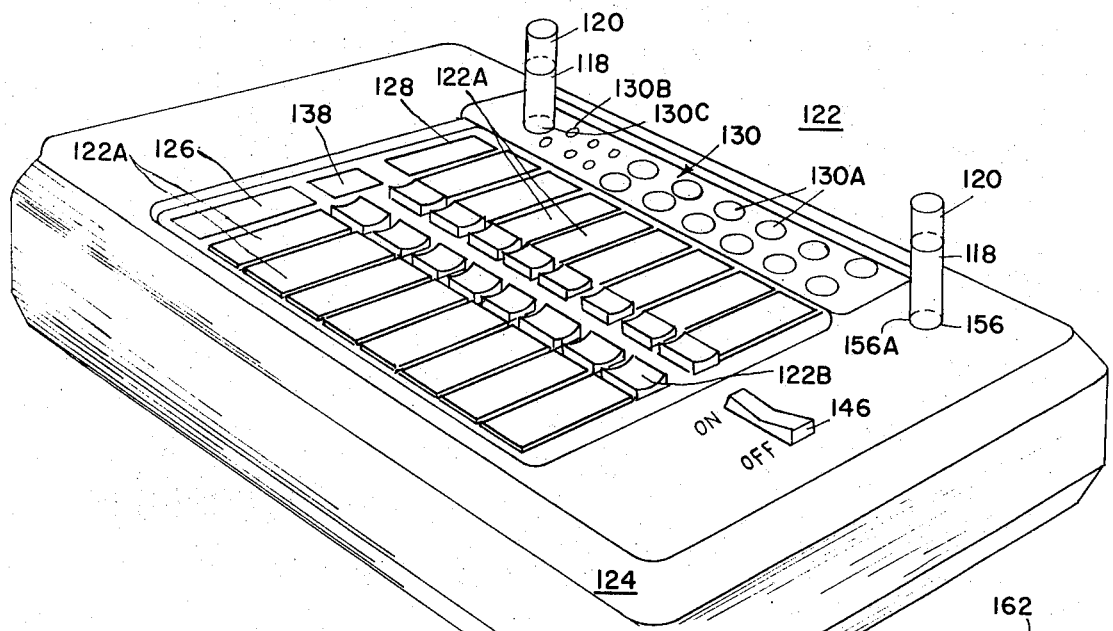
FIG. 13 is a top perspective of a test console in a preferred embodiment of a normalized testing means providing a multiplicity of constituent concentration and a prothrombin time tests all normalized to a single readout device.
Figures 14, 15A, 15B:
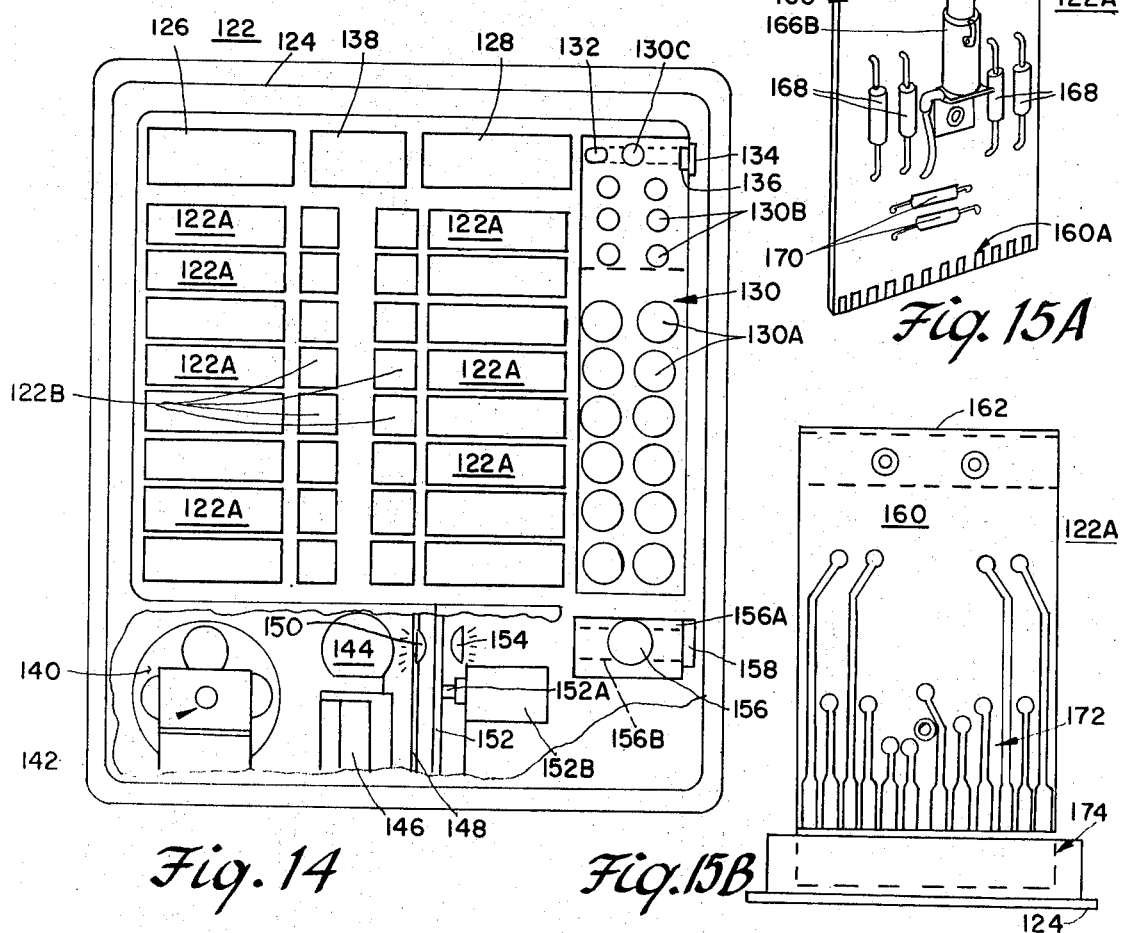
FIG. 14 is a top plan view of the console of FIG. 13 partially broken away to show a portion of the interior of the console.
FIG. 15A is a front plan view of a test function module of the present invention.
FIG. 15B is a back plan view of the test function module of FIG. 15A, illustrating its interconnection with the test console of FIGS. 13 and 14.

At the lowermost end of the modular test console 122, as it is shown and oriented in FIGS. 13 and 14, the following constituent concentration testing mechanism is provided:

The housing 124 is constructed to contain a bottom vent 140, a cooling fan 142 cooperating therewith and a constituent test exciter lamp 144, mounted in the housing 124 adjacent the fan 142. An ON-OFF power switch 146 is provided to energize the lamp 144, fan 142 and the circuitry within the console and extends to a position shown above the case 124 as shown in FIG. 13.

An intermediate wall or divider 148 is provided in the housing 124 to maintain the fan 142 and lamp 144 isolated from the rest of the constituent concentration analyzing mechanism to preclude adverse affects of heat and extraneous light from the lamp 144 on any given test. The wall 148 includes a collimating lens 150 to transmit light from the test exciter lamp 144 through a selective test filter wheel 152, through a convergent lens 154 and thence through a main constituent test cavity 156 onto a main test photodetector 158.

The main test cavity 156 is formed of molded plastic or other suitable material 156A, adjacent the lower end of the incubator block 130 but not forming a part thereof. As shown in FIG. 14, the main test cavity 156 includes an optical path or ports 156B passing diametrically therethrough and being in optical alignment with the collimating lenses 150 and 154 and the main photodetector 158. Thus, light passing through the test filters on the filter wheel 152 is directed through the optical port 156B, through the main test cavity 156 and onto the main photodetector 158.

As shown in FIG. 13, test cuvettes 120 with contained test samples 118 are placed one at a time in the main test cavity 156, whereby the light impinged upon the photodetector 158 must first pass through both the cuvette 120 and the sample 118. Thus, the absorption of preselected wavelengths of this light, by the sample, will provide the parameter from which the particular concentration of the selected constituent can be calculated and displayed on the digital read-out device 138.

The lens 150 is used to provide collimated light so that the transmission of spurious wavelengths of light through the interference filters in the filter wheel 152 will be minimized. The lens 154 is a convergent lens which converges the monochromatic light passed by the filter wheel 152 so as to pass through only a portion of the cuvette cross-section and form a light pattern at the photocell which is fully contained within the cell's active surface.

For automatic positioning of the proper interference filter on the filter wheel 152 between the collimating and convergent lenses 150 and 154, respectively, the filter wheel 152 is mounted on a rotary shaft 152A which is driven by a servo motor 152B to index the filter wheel 152. The operation of this motor 152B and the resulting selective positioning of the filter wheel 152 is coordinated with the energization of a particular test module 122A in the console 122 as will be more fully described hereinafter.

As best illustrated in FIGS. 15A and 15B, each of the modules 122A comprises a plug-in printed circuit board 160 having intergral plug-in edge fingers 160A at the lowermost extremity thereof, a translucent display legend plate 162 mounted at the upper end thereof on a pair of brackets 164, a display legend illuminating lamp 166 mounted in a board-mounted socket 166B beneath the legend plate 162, and a plurality of test select resistors 168 and test select diodes 170 mounted thereon as external components in electrical interconnection with printed circuits 172 on the back side of the circuit board 160.

As illustrated in FIG. 15B, each circuit board 160 is adapted to be received in a conventional plug-in socket member 174, the latter being mounted in the housing 124 of the test console 122.

THE TESTING SYSTEM

Referring to FIG. 16, the constituent concentration and prothrombin time test system 200, embodied in the console 122 will now be described.

The main photodetector 158 is shown as providing an input signal through an input lead 202 to a preamplifier circuit 204, the latter providing an output voltage Eλ on an output lead 206.

A gain transfer switch 208 is provided for selectively switching gain control resistors R1 and R2 into the preamplifier circuit 204 to thereby selectively constrain two distinct gain factors on the preamplifier circuit 204. These two gains are utilized by the system in establishing a reagent blank reference during the various tests to be performed and will be more fully described hereinafter. The gain control resistors represent two of the test select resistors (168 in FIG. 15A) in any given one of the test modules 122A and are preselected as to respective values for the test being performed.

For the present, let it suffice that the preamplifier circuit 204 has a linear transfer function and that it converts the input signal from the main photodetector 158 from a current linearly proportional to the light intensity received by the main photodetector 158 to a proportional voltage Eλ on the output lead 206.

The output lead 206 connects with a first input 210A to a log converter circuit 210, the latter acting to convert the voltage Eλ from the preamplifier 204.

The digital pulse signal DPS appears on an output lead 210B which extends to a first test signal input terminal 212A of a main test control circuit 212.

A second test signal input terminal 212B is provided in the main control circuit 212 to receive a prothrombin time test signal as will be more fully described hereinafter.

The initiation of the pulse signal DPS is constrained by the application of a start conversion signal SCS1 emanating from a first output terminal 212C of the main control circuit 212 and applied to a second input terminal 210C of the log converter circuit 210.

When the pulse interval T of the signal DPS is completed, the main control circuit 212 is reset by a stop conversion signal SCS2, emanating from a second output terminal 210D of the log conversion circuit 210 and applied to a third input terminal 212D in the main control circuit 212.

A variable resistance R3 controlling the coefficient of the logarithmic function of the log converter circuit 210 is connected in circuit with an input 210E as will be more fully described hereinafter.

A second output terminal 212E is provided in the main control circuit 212 which carries an up/down count signal UDS which is applied to the input 214A of an up/down counter circuit 214, the latter having an output 214 B from which emanates binary-coded-decimal data signals BCD which are applied directly to a first input 216A of a decoding driver and digital display network 216.

The driver and display network 216 includes a blanking signal input 216B to which is applied a blanking signal BS emanting from a blanking signal output 212F in the main control circuit 212.

The up/down count signal UDS emanating from the output 212E of the main control circuit 212 is controlled by a count-up switch 218, applying a count-up command to a first count command input 212G of the main control circuit 212 and a count-down switch 220 applying a count-down command to a second count command input 212H of the main control circuit 212.

The remaining external connections to the main control circuit 212 consist of a counting frequency command input 212J and a clock input 212K.

The counting frequency command input 212J receives a counting frequency signal FS from the output 222A of a reference oscillator 222, the latter having a frequency control input 222B which is in circuit with a frequency control resistor RC. The frequency control resistor RC is representative of another one of the test select resistors (168 in FIG. 15A) in each of the test modules 122A. The value of the control resistance RC is peculiar to the test being made and thus, the counting frequency signal FS is constrained to a particular value when a given one of the test modules 122A is energized by means of the corresponding one of the test select switches 122B.

The clock input 212K of the main control circuit 212 receives a fixed frequency clock or reference input signal CS which emanates from the output 224A, of a frequency divider 224, the latter having its input 224B connected to a fixed frequency output 226A of a power supply 226.

The power supply 226 is connected at its input 226B to an A.C. line and for example, puts out a 60Hz signal at the fixed frequency output 226A. This is applied to the input 224B of the frequency divider 224, which, for example, divides the frequency by a factor of 6, such that the clock signal CS, appearing at the output 224A thereof and applied to the clock input 212K of the main control circuit 212, is a 10Hz clock signal.

Other output 226C and 226D are shown on the power supply 226.

The output 226C may comprise a power output for energizing one or both of the test exciter lamps 144 and/or 132 while the output 226D may comprise a family of output terminals for supplying a variety of requisite voltages to various circuit elements in the system 200.

The filter wheel 152, its drive shaft 152A and its positioning servo motor 152B are controlled by means of a servo control circuit 228 having a position input 228A, a position output 228B and a feedback input 228C, the latter being fed a position feedback error signal PS from the output 230A a feedback generator 220 suitably constrained by the position assumed by the drive shaft 152A of the filter wheel 152 to provide the positional error signal PS.

The position input 228A of the servo control circuit 228 is selectively connected in circuit with a servo command resistance RS, representative of the remaining one of the test select resistors (168 in FIG. 15A) in each of the test control modules 122A. Thus, various values of the resistance RS are switched into circuit with the position input 228A such that the servo motor 152B is commanded by the servo control circuit 228 to constrain the filter wheel 152 to a given rotational position and thereby present a specific interference filter between the exciter lamp 144 and the main test cavity 156 (as previously described in connection with FIG. 14). When any given test control module 122A is energized by selective activation of one of the test select switches 122B, the filter wheel 152 is automatically correllated to the particular test to be performed to present the proper wave lengths of light to the sample being tested for a particular constituent concentration.

The incubator block 130 in the test console (122 in FIGS. 13 and 14) is supplied with heat at a heat input 130C, the applied heat emanating from a heat output 232B in a temperature control circuit 232. The incubator block 130 includes a heat sensing connection 130D which is connected to a heat sensing input 232C in the temperature control circuit 232.

A heat control input 232A is also provided which is in circuit with a variable heat control resistance RH, incorporated in the incubator temperature control module (126 of FIGS. 13 and 14) to permit selection of a desired incubating temperature in the incubator block 130.

The prothrombin photodetector 136 applies its output current to the input 234A of a prothrombin time circuit 234, the latter having an output terminal 234B directly connected with the prothrombin information input 212B in the main control circuit 212.

The prothrombin time circuit 234 amplifies and differentiates the output current of the prothrombin photodetector 136, which output current includes two predictable changes during the prothrombin test as will be more fully described hereinafter. These changes result in two prothrombin control signal PCS which emanate from the output 234B and are applied to the input 212B to ultimately control the up/down counter circuit as will be described in conjunction with the operation of FIG. 16.

The system is completed by a test switch selection matrix 236 which includes the test-select switches 122B. This matrix will be more fully described hereinafter. At this time, however, it is sufficient to understand that each of the switches 122B constrains a particular module 122A to be placed in circuit with the system 200 together with its test select resistances R1, R2, RC and RS which are valued specifically for the test controlled by that module. Thus, this switching function normalizes the system 200 to the particular test selected.

As will be described in more detail in connection with FIG. 17, the count up switch 218 and the count down switch 220 are so positioned in the test console 122 as to be controlled by the insertion of a cuvette 120 (FIGS. 13 and 14) into the main test cavity 156 to provide a digital count (count-up) for an open test cavity condition and a digital count (count-down) for a full test cavity condition; the latter condition comprising full insertion of a cuvette 120 containing a test sample 118 into the said main test cavity 156.

THE PREAMPLIFIER AND LOG CONVERTER CIRCUITS

The test performed by the present invention are effected by absorption photometry. The physical laws of absorption photometry require that the light power or related parameters be converted to a logarithmic function in order to derive a parameter directly related to the concentration of the absorbing constituent.

Figure 17:
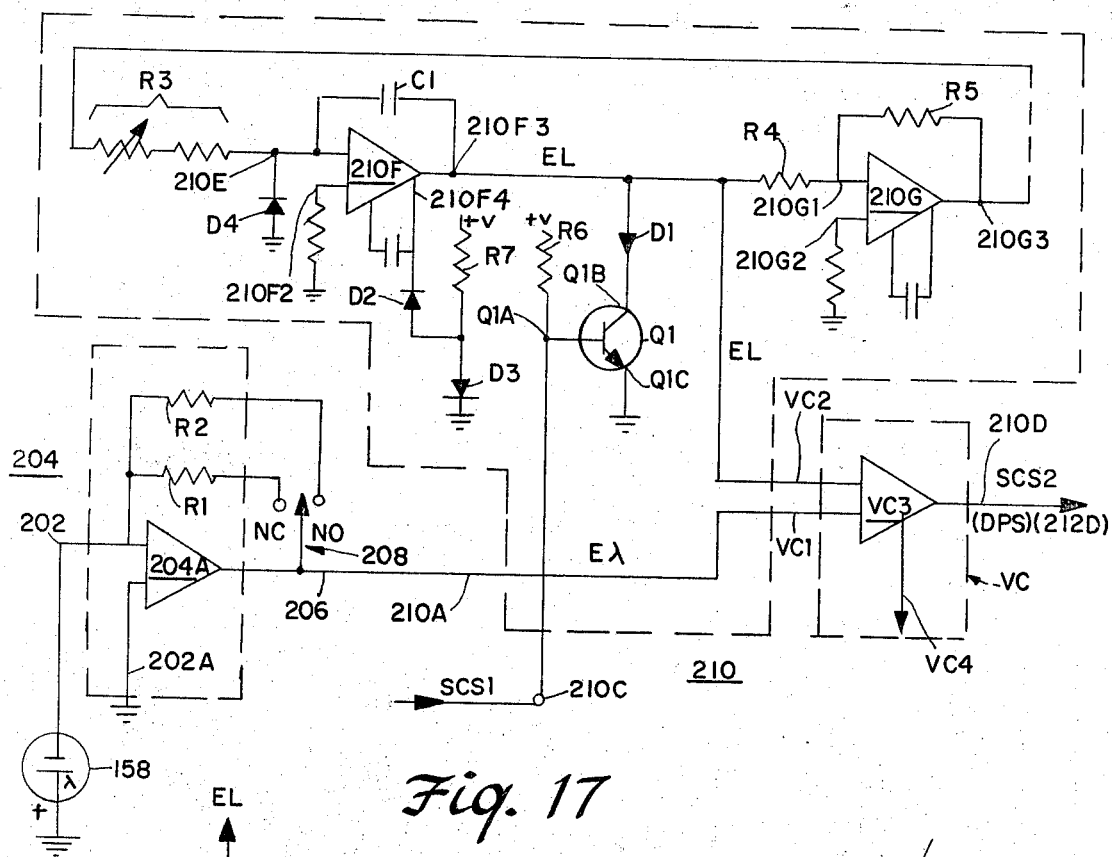
FIG. 17 is a circuit schematic of a preferred embodiment of the photocell preamplifier and log converter circuits of the present invention for constituent concentration analysis.

Referring to FIG. 17, such a logarithmic conversion and a preferred embodiment of the log converter circuit 210 together with a preferred embodiment of the preamplifier circuit 204 for the main photodetector 158 will now be described.

The main photodetector 158 is shown as a photovoltaic cell which generates a current $i\lambda$, in the input lead 202, directly proportional to the light power impinging on the said cell from the test exciter lamp 144 (FIG. 14).

This current is converted to a voltage $E\lambda$ in the preamplifier 204 by a general purpose operational amplifier 204A which has as one of its inputs the input lead 202. The other input is designated 202A and is connected to ground.

The gain control switch 208 is shown as a single-pole, double-throw switch having a normally closed (NC) contact for connecting the first gain control resistance R1 from the preamplifier output 206 to the cell current input terminal 202 in a feedback configuration.

The gain switc 208 has a normally open (NO) contact for selectively connecting the second gain control resistance R2 from the preamplifier output 206 to the cell current input terminal 202 in a feedback configuration. The purpose of the two gain control resistors will be more fully described hereinafter.

The gain equation of the preamplifier circuit is $$E\lambda = i\lambda \cdot R, \qquad 1.$$

where
R is the selected value of the feedback resistances R1 and R2.

Once the voltage $E\lambda$ has been generated by the preamplifier 204, it is applied through the output 206 to the input 210A of the log converter circuit 210. The input terminal 210A corresponds to a first input terminal VC1 of a voltage comparator circuit VC, the latter further compising a second input terminal VC2 an operational amplifier VC3 and a bias terminal BC4 for said amplifier connected to a suitable source of bias (not shown).

The output of the voltage comparator VC comprises the output 210D of the log converter circuit 210 at which output the digital pulse signal DPS appears for transmission to the stop conversion input terminal 212D of the main control circuit 212.

Once the voltage function $E\lambda$ has been produced by the preamplifier 204, the log conversion of this function is accomplished by generating an exponential function of time which is represented by a time varying voltage $E_L$, applied to the second input terminal VC2 of the voltage comparator VC, which increases until it equals the input voltage $E\lambda$, whereby a signal is generated at the output 210D and is applied to the stop conversion input 212D to indicate the conversion is complete.

At this time it should be noted that the digital pulse signal DPS and its time interval T are shown in FIG. 16 as following a phantom circuit path 210B – 212A in order to functionally disclose the system of the present invention in block diagram form. Actually, as will be more fully described hereinafter, the signal DPS and its time interval T are determined between the log conversion circuit 210 and the main control circuit 212 as a function of the time interval T between the start conversion and stop conversion signals SCS1 and SCS2, respectively.

The log converter circuit 210 further includes first and second operational amplifiers 210F and 210G, the first being connected as a conventional analog integrator and the second being connected as an inverting buffer amplifier in a feedback configuration with the integrating amplifier 210F.

The integrating amplifier 210F has as one of its inputs the terminal 210E to which is connected one end of the variable resistance R3 previously described in reference to FIG. 16 as an adjustment for the coefficient of the log conversion function produced by the log converter circuit 210. The other end of the variable resistance R3 is connected directly to the output 210G3 of the buffer amplifier 210G, the latter including first and second input terminals 210G1 and 210G2, respectively.

The integrating amplifier 210F includes a second input 210F2 and an output 210F3, the latter being connected directly to one end of an input resistor R4. The other end of the input resistor R4 is connected directly to the first input terminal 210G1 of the buffer amplifier 210G.

The integrating amplifier 210 F includes an integraing capacitor C1, directly connected from its output 210F3 to its first input 210E.

The buffer amplifier 210B includes a feedback resistance R5 directly connected from its output 210G3 to its first input 210G1.

A first clamping network comprising a diode D1 and a clamping transistor Q1 having base Q1A, collector Q1B and emitter Q1C is provided at the output 210F3 of the integrating amplifier 210F. This network is configured with the diode D1 connected by its anode to the output 210F3 and by its cathode to the collector Q1B of the clamping transistor Q1. The emitter Q1C of the transistor Q1 is connected to ground while the base Q1A is connected directly to the start conversion input 210C of the log converter circuit 210. This start conversion input 210C, as previously described with reference to FIG. 16, is directly connected to the start conversion output 212C of the main control circuit 212. The base Q1A is also connected to a source of suitable bias through a biasing resistance R6 to complete the first clamping circuit.

A second clamping circuit is provided which comprises two diodes D2 and D3 commonly connected at their respective anodes with the cathode of one diode D2 connected to the clamping input 210F4 of the integrating amplifier 210F. The other diode D3 is connected at its cathode to ground and the common anode connection of the diodes D2 and D3 is connected through a biasing resistance R7 to a suitable source of bias.

The input 210E of the integrating amplifier 210F is clamped through the cathode-anode path of a fourth clamping diode D4, the anode of which is connected to ground.

The remaining resistors and capacitors shown in FIG. 17 in the log converter circuit 210 are for compensation and biasing as is well known in the art and no further description of these elements is necessary.

LOG CONVERTER OPERATION

Before describing the operation of the system 200 of FIG. 16 and prior to a detailed description of the other elements and circuits therein, the operation of the log converter circuit 210 and its correlation to the concepts of the system 200 will now be described.

Assuming the transistor Q1 to be turned ON, the log converter 210 begins the generation of its exponential function, resulting in the time varying voltage $E_L$ at the second input terminal VC2 of the voltage comparator VC, when a start conversion signal SCS1 is applied to the base Q1A of the clamping transistor Q1, via the input terminal 210C, turning the transistor Q1 OFF, causing the normal forward conduction of the clamping diode D1 and the clamping transistor Q1 to cease. The second clamping network comprising the resistance R7 and diodes D2 and D3 act to prevent the value of $E_L$ from going below zero volts. The fourth clamping diode D4 limits the negative excursion of the input 210E of the integrating amplifier 210F to one diode junction voltage drop and speeds recovery of the integrating amplifier 210F, which is reset by removal of the start conversion signal SCS1, permitting the clamping diode D1 and clamping transistor Q1 to resume forward conduction and return the value of the voltage $E_L$ to an initial value determined by this state of forward conduction.

The mathematical relationships between the parameter E$\lambda$ and the time varying voltage $E_L$, are as follows:

$$E_L = B/R3Cl \quad E_L \, dt \qquad \qquad 2.$$

Where
B = Buffer (210G) gain = $R5/R4$
The solution of equation (2) is:

$$t = R3C1/B \ln (E_L/e_o) \qquad \qquad 3.$$

Where
$e_o$ is the initial value of $E_L$ when (time) $t = 0$

Figure 18:
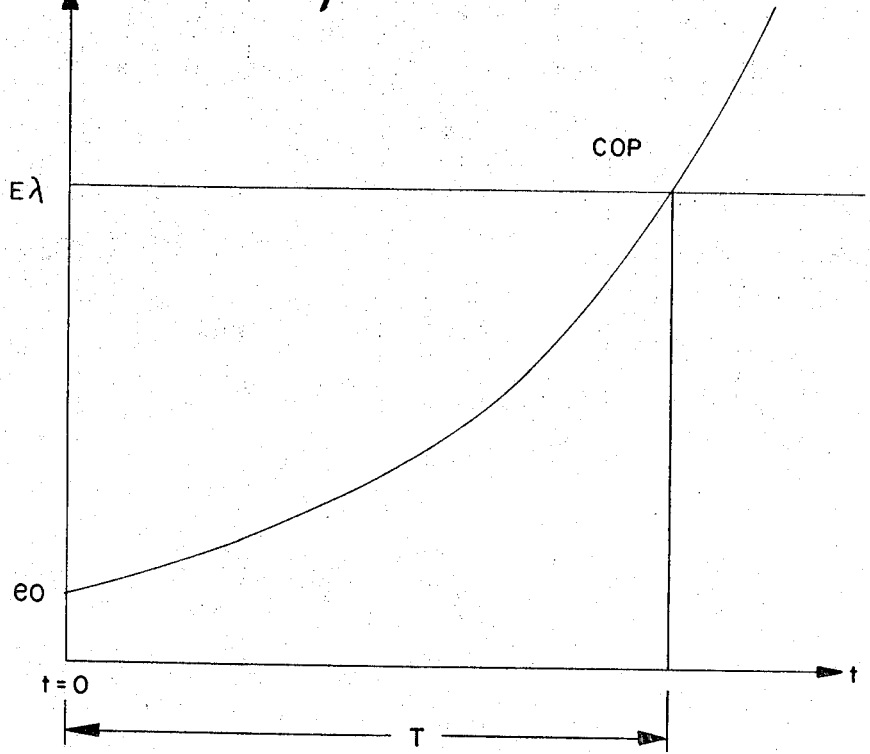
FIG. 18 is a graphic representation of the voltage output functions and timing interval resulting therefrom relating to the log converter circuit of FIG. 17.

A graph of the exponential function is shown in FIG. 18 and is explained by the following:

For a given amount of light impinged upon the main test photodetector 158, the output voltage E$\lambda$, is from the preamplifier 204 and at the first input VC1 of the voltage comparator VC, is a constant voltage. Thus, E$\lambda$, is shown as a horizontal line on the $E_L$ vs $t$ graph of FIG. 18.

A time T (the duration of the information signal DPS of FIG. 16) will be required for the voltage $E_L$ to build up exponentially from its initial value $e_o$ to be equal in magnitude to the reference voltage E$\lambda$. When equal, the crossover point COP will be detected by the voltage comparator circuit VC, whereby that circuit will generate the stop conversion signal SCS2 at its output 210D.

Having defined the time interval T it may be expressed as follows:

$$T = (R3C1/B) \ln (E\lambda/e_o) \qquad \qquad 4.$$

In terms of log to the base 10, this may be written:
$$T = 2.3026 \, (R3C1/B) \log_{10} (E\lambda/e_o) \qquad 5.$$

Now, substituting from equation (1):
$$T = 2.3026 \, R3C1/b \log (R/e_o) \, i\lambda \qquad 6.$$

Where
R may be either R1 or R2 depending upon the selection position of the gain switch 208 in the preamplifier 204.

THE SYSTEM CONCEPT

With the foregoing relationship established, the concept of the system 200 of the present invention can best be described by development of the Beer-Lambert law upon which photometric measurements, such as those involved herein, are based.

This law may be expressed:
$$P = P_o \, 10^{-abC} \qquad 7.$$

Wherein:
$P$ = light power transmitted through unknown (i.e. cuvette 120 and sample 118)
$P_o$ = reference light power — e.g., blank equivalent to zero concentration of constituent under test
$a$ = absorptivity
$b$ = light path length through medium under test
$C$ = concentration of unknown Expressed as a logarithmic function, equation (7) becomes:
$$\log P/P_o = \log T_R = -abC \qquad 7a.$$

Wherein
$T_R = P/P_o$ = relative transmittance expressed as a function.
Therefore:
$$abC = -\log T_R = A \qquad 7b.$$

Where
A = absorbance, and
$$C = -(1/ab) \log T_R \qquad 7c.$$

Now, since $T_R = P/P_o$, then
$$C = -(1/ab)(\log P - \log P_o) \text{ or} \qquad 7d.$$
$$C = (1/ab) \log P_o - (1/ab) \log P \qquad 8.$$

Therefore, we find that the concentration C of an unknown in a test sample can be expressed as the difference between two logarithmic functions.

In the system 200, the digital up-down counter 214 is utilized to derive this value of constituent concentration.

The count made by the counter 214 is equal to the frequency (f) of the oscillator input signal FS multiplied by the time interval over which the count is made.

Therefore, the time interval T of the signal DPS from the log converter 210 (i.e., the interval berween the start and stop conversion signals SCS1 and SCS2) can be used directly with the counter 214 with the Frequency $f$ treated as a scale factor.

Thus, from equation (6):
$$\text{Count} = 2.3026f \, (R3C1/B) \log (R/e_o) \, i\lambda \qquad 9.$$

Since $i\lambda = K\lambda P$ where $K\lambda$ is the transfer function of the photovoltaic cell 158 it follows that:

$$\text{Count} = 2.3026f \, R3C1/B \log (R/e_o) \, K\lambda P \qquad 10.$$

Equation (8) suggests that a calibrated and referenced measurement can be made from two basic measurements. First, one with an unknown and a corresponding light power P transmitted therethrough and second, one with a reference and its corresponding transmitted light power P.

Correlating this approach with the count factor established by equation (10) two measurements resulting in two such counts are made in the determination of any given constituent concentration in a test sample.

For positive functions, i.e., those generated by the response of increased absorbence with increased constituent concentration, the first count is an UP count (count increasing from zero) with the main test cavity 156 (FIGS. 13 and 14) open.

An open test cavity 156 is used in the present invention rather than dual beam methods known in the art because with the techniques of the present invention the elimination of ambient variables is effected and only common optical elements need be utilized to achieve maximum rejection of those ambient variables associated with those optics.

The reference or open cavity count $C_{oc}$ may now be defined as follows:
$$C_{oc} = 2.3206f \, (R3C1/B) \log (R1/e_o) \, K\lambda P_{oc} \qquad 11.$$

Where $P_{oc}$ is the light power transmitted to the main photodetector 158 through the open test cavity 156 (FIGS. 13 and 14).

The second count is made to subtract from the first count and is derived with the unknown substance (cuvette 120 and sample 118 of FIG. 13) in the path of light through the test cavity 156 (FIGS. 13 and 14). This count is termed the closed cavity count $C_{cc}$ and is defined as:
$$C_{cc} = 2.3026F \, (R3C1/B) \log (R2/e_o) \, K\lambda P \qquad 12.$$

Since the open condition of the main test cavity 156 is used to simulate a reference (distilled water or standard reagent blank the following equation defines the relationship of the gain control resistors R1 and R2.
$$R2P_o = R1 \, P_{oc} \qquad 12a.$$

At this time another definition of transmittance is defined, known as the cavity transmittance, having two forms, namely, open cavity transmittance ($T_{oc}$) and filled cavity transmittance $T_u$, the latter being with the unknown substance in the light path, as follows:
$$T_{oc} = (P_{oc}/P_{in}) \text{ and } T_u = P/P_{in} \qquad 12b.$$

Where
$P_{in}$ = light power entering the main test cavity 156.

Therefore, the closed cavity transmittance $T_u$ is expressed as the ratio of light power (P) incident on the photodetector 158 relative to the light power ($P_{in}$) into the cavity 156.

Combining equations (11) and (12) in terms of the foregoing definitions, it follows that:
$$C_{oc} = 2.3026f \, (R3C1/B) \log (R1/e_o) \, K\lambda \, P_{in} \, T_{oc} \qquad 13.$$
$$C_{cc} = 2.3026f \, R3C1/B \log (R2/e_o) \, K\lambda \, P_{in} \, T_u \qquad 13a.$$

Upon substraction of $C_{cc}$ from $C_{oc}$ by use of the up-down counter 214 (FIG. 16), we derive the desired constituent concentration value ($C_v$) in the counter as follows:

$$C_v = C_{oc} - C_{cc} = 2.3026f(R3C1/B\ [\log(R1/e_o)\ K\lambda\ P_{in}\ T_{oc} - \log(R2/e_o)\ K\lambda\ P_{in}\ T_u] \quad 14.$$

Rewriting equation (14):

$$C_v = 2.3026f\ R3C1/B\ \log(R1/R2)\ (T_{oc}/T_u), \quad 15.$$

all of the remaining terms being cancelled ($e_o$, $K\lambda$ and $P_{in}$).

The use of the foregoing dual measurement (count and common light path) results in the elimination of the common photometric variables normally encountered in such measurements.

The parameter $P_{in}$, for example, includes such things as the exciter lamp (144, FIG. 14) intensity which varies with voltage, lamp aging and foreign matter on the lamp envelope; and the accumulation of foreign matter on the various optical elements, namely, the lenses 150 and 154, filters in the wheel 152, and on the main photodetector 158 (all shown in FIG. 14).

Also eliminated from consideration are the photocell transfer function ($K\lambda$) and the initial value of $E_L(e_o)$. The latter quantity is of particular interest because the circuit design in the log converter circuit 210 (FIG. 17) can be simplified, the need for regulating the quantity ($e_o$) having been eliminated.

The remaining terms in equation (15), namely, the oscillator frequency (f), and the circuit parameters R1, R2, R3, R4, R5 and C1 can be held to very close tolerances with state of the art components.

Only the open cavity transmittance $T_{oc}$ remains as a potentially ill defined quantity relative to the other parameters. Included hereinafter is the description of a preamplifier embodiment which will compensate for this condition and provide a better defined quantity for more accurate test results.

For the present, however, suffice it to say that the open cavity transmittance $T_{oc}$ is sufficiently controlled.

Figure 19:
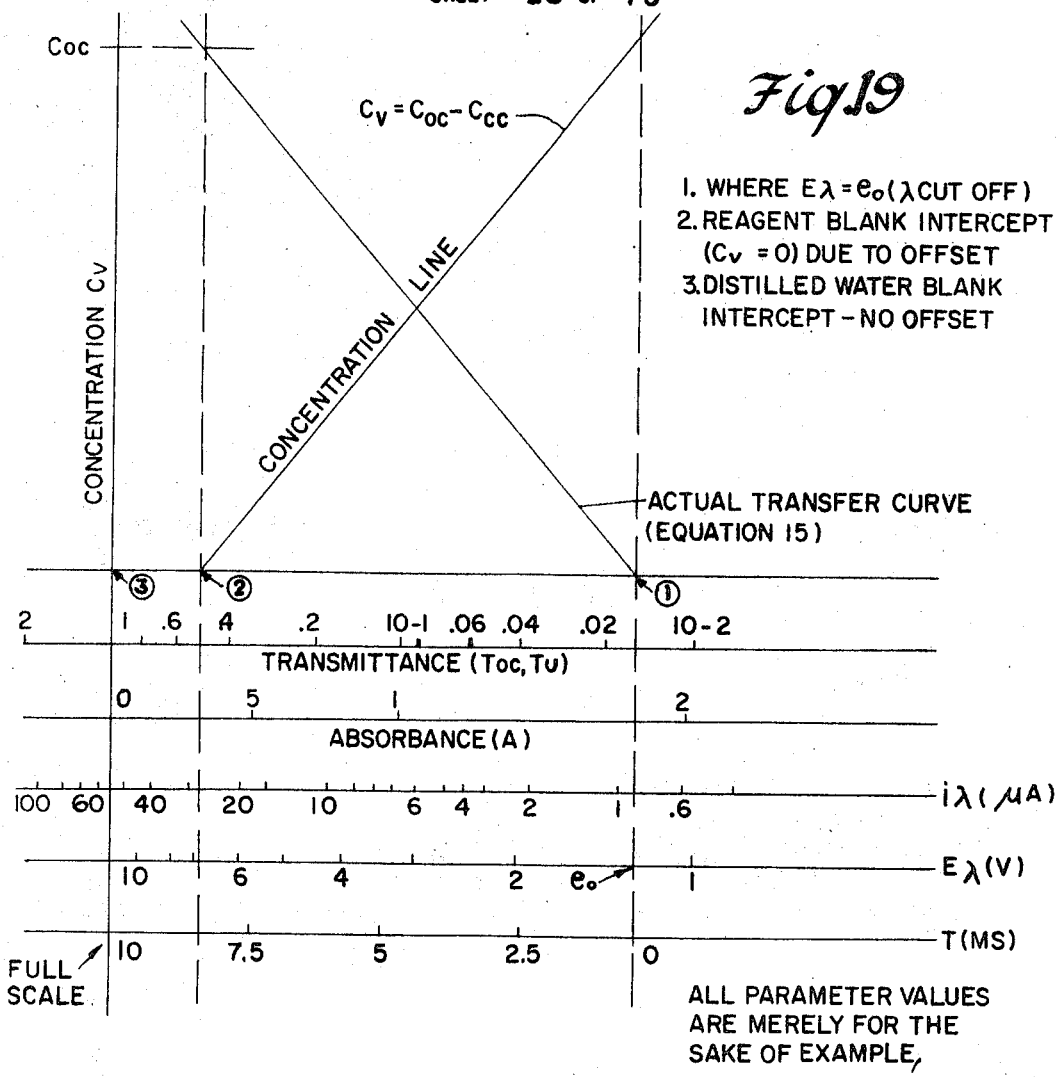
FIG. 19 is a graphic illustration of the concentration line functions of the system of FIGS. 16 and 17.

Referring now to FIG. 19, a graphic display of the constituent concentration $C_v$ is shown as a concentration line $C_v$ which has two defining parameters, namely, the slope of the line and the reagent blank offset.

In equation (15), it is seen that the slope of the line is varied in direct proportion to the oscillator frequency (f) which is the frequency of the counting signal FS applied to the input 212J of the main control circuit 212 (FIG. 16); the changing of any factor (R1, R2, $T_{oc}$ and/or $T_u$) of the logarithm will cause the concentration line $C_v$ to translate left or right on the graph in FIG. 19.

This translation of the constituent concentration line $C_v$ is determined by the reagent blank from which the quantity ($P_o$) is defined, namely, from equation (12a):

$$P_o = R1/R2\ P_{oc} \quad 15.$$

which is clearly a function of the ratio of the gain control resistors R1 and R2 in the preamplifier circuit 204 (FIGS. 16 and 17).

GENERAL SYSTEM OPERATION

With the foregoing theory and its correlation with the concepts of the test system of the present invention defined, reference is again made to FIG. 16 for the purpose of describing the general operation of the present invention. This will be done prior to more detailed explanation of the main control circuit 212, servo control circuit 228, temperature control circuit 232, oscillator circuit 222, test switch matrix 236 and other related components of the system 200 in order to better set the state for the respective descriptions of these components.

Assuming that the preamplifier 204 has generated the output voltage $E\lambda$ and the log converter has generated the time varying voltage $E_L$, and further assuming that the count control signal UDS has been applied to the up-down counter 214 via its input 214A, the counter 214 will count at a rate proportional to the frequency (f) of the reference oscillator signal FS applied to the input terminal 212J of the main control circuit 212.

The counter 214 operates as a BCD (binary coded decimal) counter and the resulting count is displayed in decimal form by the digital display device 216. The display of any given count, however, is selectively blanked via the blanking signal BS emanating from one of the outputs 212F of the main control circuit 212 and applied to the display device input 216B.

Thus, the main control circuit 212 generates the blanking signal BS to permit only the final results of the test count to be shown, i.e., the resulting difference between the up and down counts and vice-versa, for any given constituent concentration test performed by the system 200.

With the foregoing understood, the energization of a given test select button 122B switches its respectively associated test module 122A into the system 200 such that the values of the standard resistance parameters R1, R2, RC and RS are switched into circuit with the preamplifier 204 (R1 and R2) to set the gain and the reagent blank ratio; the reference oscillator 222 (RC) to establish the proper counting frequency; and the servo control 228 (FS) to position the proper interference filter (on wheel 152) in the optical path of the main test exciter lamp 144 and main test cavity 156 (see FIGS. 13 and 14); thereby, normalizing to system 200 to the given test to be performed. Therefore, the digital readout on the display device 216 will be of the proper order of magnitude for the constituent concentration comprising the unknown sought in the particular test being performed.

Now, assuming a positive slope to the constituent concentration function $C_v$ of FIG. 19, the count up switch 218 is activated when a cuvette 120 is first inserted into the top of the main test cavity 156. While this is not shown in FIGS. 13 and 14, the switch 218 may comprise a microswitch energized by engagement with the cuvette 120 or it may be manually actuated.

Upon actuation of the count up switch 218, the main control circuit issues a count up command UDS to the counter 214. At this time, the preamplifier circuit 204 has the open cavity gain control resistor R1 in circuit therewith via the normally closed position of the gain control switch 208 and, by action of the log converter 210, the voltage $E\lambda$ is converted to a count in the counter 214 which is proportional to the time interval (T) of the digital pulse signal DPS and the frequency (f) of the reference oscillator signal FS. In other words, the counter 214 counts at a rate proportional to the reference oscillator frequency (f) over the DPS time interval (T).

As the cuvette 120 is further inserted into the main test cavity 156 (FIGS. 13 and 14), the gain transfer switch 208 is adapted to be energized to its normally open position, thereby switching the open cavity gain resistor R1 out of the preamplifier circuit 204 and inserting the filled cavity gain resistor R2 in the circuit instead.

As in the case of the count-up switch 218, the gain transfer switch 208 may comprise a micro-switch located in the main test cavity 156 to be engaged by a cuvette 120 in such a way that its physical location in that cavity 156 constrains it to close its normally open contact upon engagement with the cuvette 120 but subsequent in time to the actuation of the count-up switch 218.

Therefore, as the cuvette 120 is progressively inserted into the main test cavity 156, automatic programming of the system 200 from open to full cavity gain conditions takes place. When the cuvette 120 reaches the bottom of the main test cavity 156, the count down switch 220 is actuated to constrain the counter 214 to generate a second count for the resulting signal voltage Eλ which is subtracted from the first count.

Therefore, the resulting number remaining in the counter 214 will be the difference of the open cavity absorbance (equated to the reagent blank absorbance by the adjusted gain of preamplifier 204 as constrained by the gain control resistors R1 and R2) and the unknown absorbance, all of which is (normalized) scaled by the count control frequency $f$ of the reference oscillator signal FS to produce a count number equal to the concentration of the desired constituent in the sample 118 in the cuvette 120.

The blanking signal BS remains ON until the desired net result of the count is reached at which time the main control circuit 212 removes the blanking signal BS from the display input 216B to permit the display of the actual constituent concentration in the display device 216.

As in the case of the other switches (208 and 218) the count down switch 220 may comprise a microswitch positioned in the bottom of the main test cavity 156 such that it is engages by and actuated by a fully inserted cuvette 120 in the cavity 156.

The Prothrombin test is based on coagulation time of the sample contained in a test cuvette, i.e., the time from the addition of a citrated blood plasma sample in a test cuvette previously filled with a thromboplastin-calcium mixture to a point at which a predetermined blood clot condition occurs.

Referring jointly to FIGS. 13, 14 and 16, the light beam from the prothrombin test exciter lamp 132 is directed through a cuvette filled with a thromboplatin-calcium mixture as known in the art the said cuvette being fully inserted in the prothrombin test cavity 130C in the incubator block 130 of the module 122. This exciter lamp 132 has been energized by actuating the prothrombin time test module 128 as will be more fully described hereinafter.

The light passes through the prothrombin cavity 130C and the cuvette and sample therein and thence through the prothrombin filter 136 (green glass filter of 525 NM) to thereby illuminate the prothrombin photodetector 134.

Initial energization of the prothrombin test module 128 causes the main control circuit 212 to emit a counter control signal UDS from its output 212E to the input 214A of the up/down counter 214, of a character constraining the counter 214 to a reset condition.

Now, when a sample of citrated blood plasma is added to the thromboplastin-calcium mixture in the test cuvette, the light transmittance therethrough undergoes an abrupt change. This abrupt change is sensed by the prothrombin photodetector 136 and the resulting signal (photovoltaic cell current) on the input 234A of the prothrombin time circuit 234, the latter acting to amplify and differentiate the signal current and apply an enabling signal from the output 234B to the input 212B of the main control circuit 212, whereby a counter control signal UDS is emitted from the control circuit output 212E and applied to the input 214A of the up/down counter 214 to constrain an up count to commence therein.

The counting frequency is derived from the clock signal CS, which is 10Hz as previously described. If the available line frequency is 50Hz as opposed to 60Hz, then the frequency divider 224 is set to divide by a factor of 5 rather than 6.

The occurrence of an output signal from the prothrombin time circuit 234 at the input 212B of the main control circuit 212, gates the clock signal CS into the up/down counter 214 via the output 212E of the main control circuit 212 and input 214A of the up/down counter 214.

As a blood clot forms in the test cuvette, the increasing absorbence of light is detected by the prothrombin photodetector 136 and the prothrombin time circuit 234 such that a predetermined rate of change of absorbence causes the clock signal CS to be gated OFF by the main control circuit 212, thereby constraining the counter 214 to stop its count. At this point, the count remaining in the counter 214 and correspondingly displayed by the decoder driver and display device 216 is the prothrombin time measurement display in seconds and tenths of seconds.

Thus, the present invention provides the means whereby a wide range of tests, with many different normalized units of result, including concentration units and time units are measured by a common readout device through common control circuitry. This results in substantial savings in cost and the number of requisite circuit elements and metering means heretofore unattainable in the art.

THE MAIN CONTROL CIRCUIT AND REFERENCE OSCILLATOR

Figure 20:
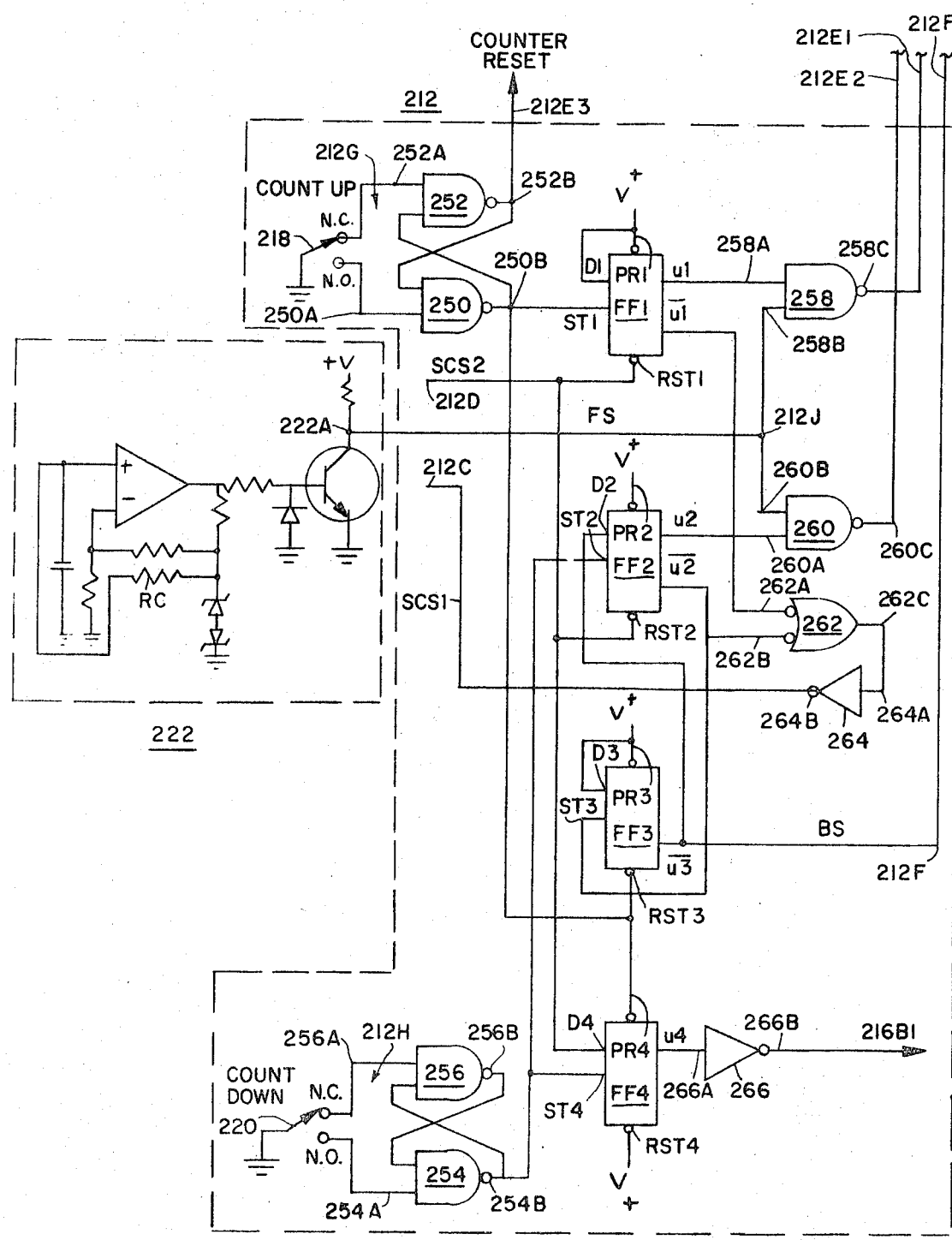
FIG. 20 is a schematic diagram of the main control circuit generally illustrated in FIG. 16.
Figure 21:
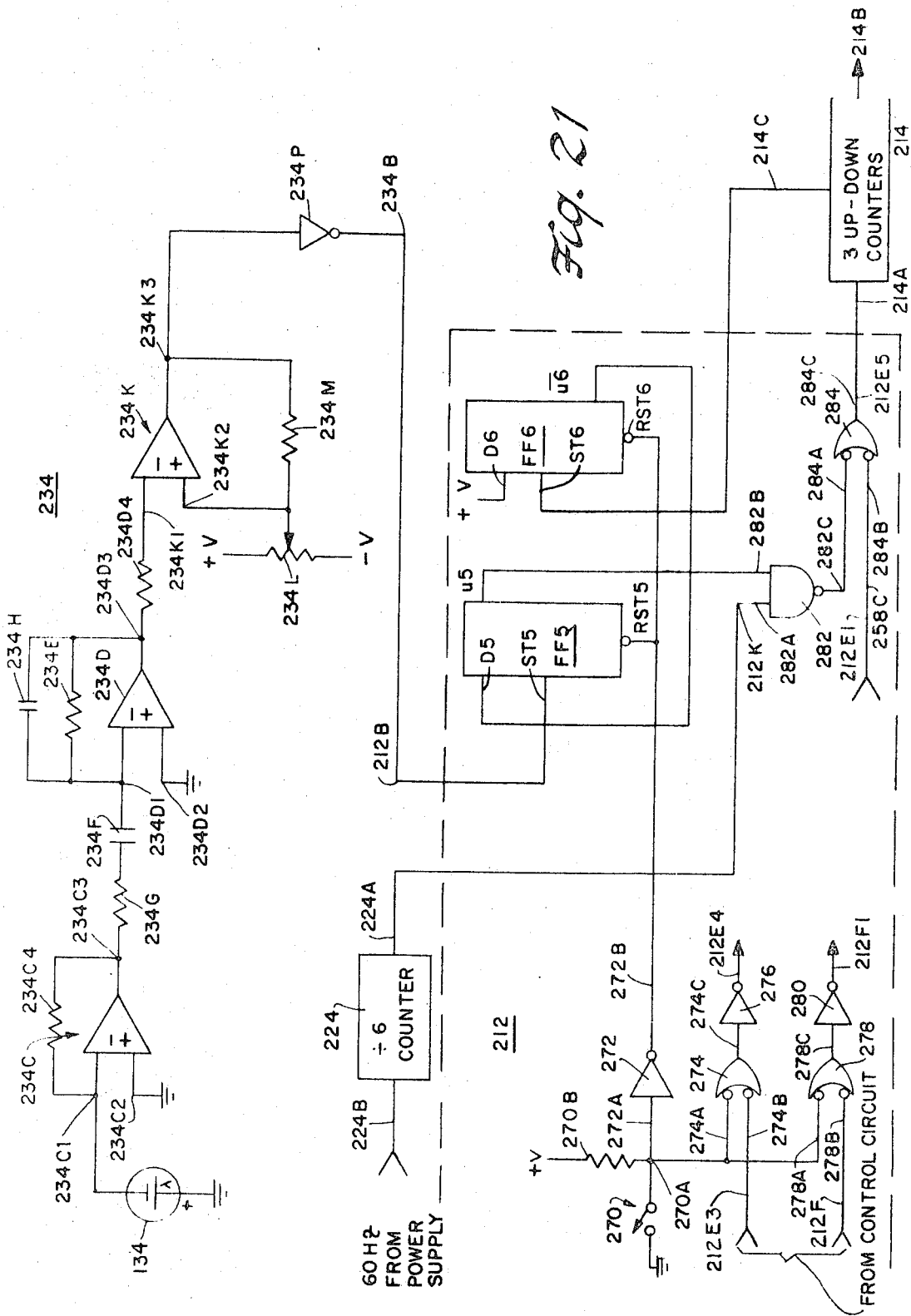
FIG. 21 is a schematic circuit diagram of the prothrombin time circuit generally illustrated in FIG. 16.
Figure 23:
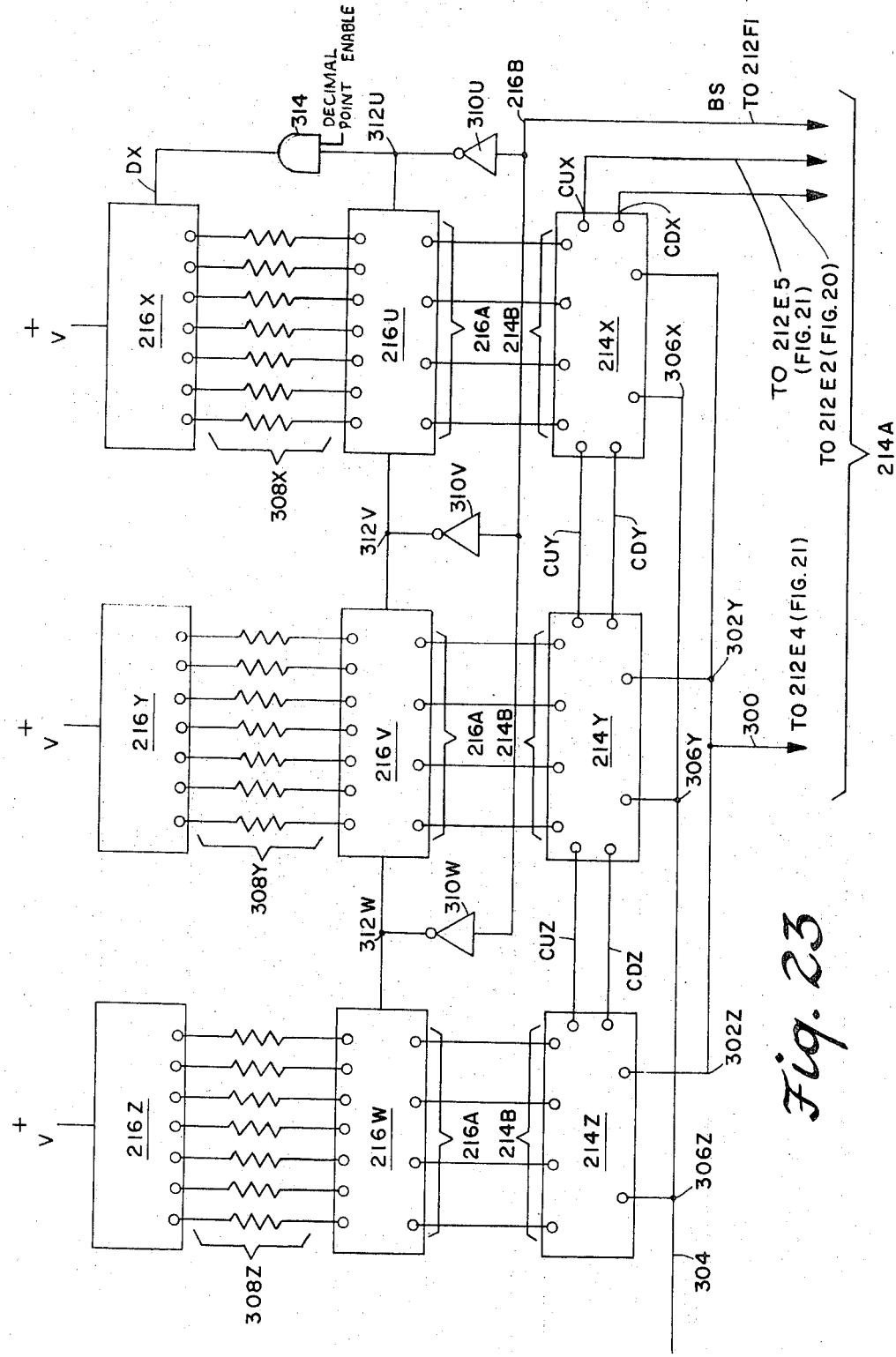
FIG. 23 is a schematic circuit diagram of the counting, driver-decoder and display circuits generally illustrated in FIG. 16.

Referring to FIG. 20, the main control circuit 212 and the refernece oscillator 222 of the testing system 200 will now be described, wherein like elements to the preceding Figures are identified by like numerals. All of the main control circuit 212 of the block diagram of FIG. 16 is shown with the exception of that portion thereof that is associated with the prothrombin time circuit 234. That portion will be described hereinafter in conjunction with a detailed description of FIG. 21.

The reference oscillator circuit 222 is conventional in the art and will not be further described except to note that the reference frequency control resistors RC in the test modules 122A are connected therein as shown to control the output frequency (of the output signal FS) of the reference oscillator 222 which appears at its output 222A and is thence applied to the reference frequency input 212J of the main control circuit 212.

In the main control circuit 212, the count up switch 218 is shown as having normally open (N.O.) and normally closed (N.C.) contacts, in a single-pole, double-throw configuration, each connected as one of the respective 250A and 252A inputs of a pair of cross-coupled NAND gates 250 and 252.

The NAND gate 252 has an output 252B, connected through a control output 212E3 to a suitable reset terminal (not shown) on the up/down counter 214 (FIG. 16). The control output 212E3 comprises a part of the counter control output 212E generally described in connection with FIG. 16.

The NAND gate 250 has an output terminal 250B which comprises a latching input to the other NAND gate 252.

The count down switch 220 is shown as having normally open (N.O.) and normally closed (N.C.) contacts, in a single-pole, double-throw configuration, each connected as one of the respective inputs 254A and 256A of a pair of cross-coupled NAND gates 254 and 256.

The NAND gate 254 has an output 254B which serves as a latching input to the other NAND gate 256, the latter having an output 256B.

The main control circuit further includes first, second, third and fourth flip-flops FF1, FF2, FF3 and FF4, respectively, which are interconnected with the various elements of the main control circuit 212 as follows:

The first flip-flop FF1 has its preset (PR1) and data (D1) terminals commonly coupled to a source of positive bias $V_{cc}$; its set terminal (ST1) directly connected to the output 250B of the NAND gate 250 at the count up switch 218; its reset terminal (RST1) directly connected to the stop conversion control input 212D; and first and second outputs U1 and U1 to be further described hereinafter.

The second flip-flop FF2 has its preset terminal (PR2) directly connected to the source of positive bias $V_{cc}$; its data terminal (D2) directly connected to the output U3 of the third flip-flop FF3; its set terminal (ST2) directly connected to the output 254B of the NAND gate 254 at the count down switch 220; its reset terminal (RST2) directly connected to the stop conversion control input 212D; and a pair of outputs U2 and U2 to be further described hereinafter.

The third flip-flop FF3 has its preset terminal (PR3) and its data terminal (D3) directly and commonly connected to the source of positive bias $V_{cc}$; its set terminal (ST3) directly connected to the output U2 of the second flip-flop FF2; its reset terminal (RST3) directly connected to the output 250B of the NAND gate 250 at the count up switch 218; and a single output U3 which comprises the control output 212F for applying the blanking signal BS to the decoder driver and display device 216 of FIG. 16.

The fourth flip-flop FF4 has its preset terminal (PR4) directly connected to the latching output 250B of the NAND gate 250 at the count up switch 218; its data terminal (D4) directly connected to the stop conversion control input 212D; its set terminal (ST4) directly connected to the output 254B of the NAND gate 254 at the count down switch 220; its reset terminal (RST4) directly connected to the source of positive bias $V_{cc}$; and a single output U4 to be further described hereinafter.

The outputs of the flip-flops FF1, FF2 and FF4 are interconnected with first and second output NAND gates 258 and 260, an output negative OR gate 262 and first and second inverters 264 and 266 as follows:

The output U1 is directly connected to first input 258A of the first output NAND gate 258, the latter having a second input 258B directly connected to the control input 212J to receive the reference frequency signal FS from the output 222A of the reference oscillator 222. The output 258C of the first output NAND gate 258 is directly connected with and constitutes the counter control output 212E1, comprising the count-up command link to the input 214A of the up/down counter 214. The output 212E1 comprises a specific part of the generally described control output 212E for control signal UDS in FIG. 16.

The output U1 of the first flip-flop FF1 is directly connected to the first input 262A of the output negative OR gate 262, the latter having a second input 262B directly connected to the output U2 of the second flip-flop FF2 and the set terminal (ST3) of the third flip-flop FF3. The output 262C of the output negative OR gate 262 is directly connected to the input 264A of the first inverter 264, the latter having an output 264B directly connected with and constituting the start conversion control output 212C from which the start conversion signal SCS1 is applied to the input 210C (base Q1A of transistor Q1 in FIG. 17) of the log converter circuit 210 of FIGS. 16 and 17.

The output U2 of the second flip-flop FF2 is directly connected to the first input 260A of the second output NAND gate 260, the latter having a second input 260B directly connected with the reference frequency control input 212J, in common with the second input 258B of the first output NAND gate 258, and an output 260C directly connected with and constituting the count down control output 212E2. The count down control output 212E2 comprises a part of the general counter control output 212E of FIG. 16 from which the general control signal UDS is applied to the input 214A of the up/down counter 214.

The interconnections of the outputs U2 and U3 of the second and third flip-flops FF2 and FF3, respectively have already been described.

The output U4 of the fourth flip-flop FF4 is directly connected to the input 266A of the second inverter 266, the latter having an output 266B which is adapted to be connected to the decoder driver and display device 216 of FIG. 17 via a control output 216B1 which overrides the blanking signal BS on the general blanking input 216B to the extent that a special display such as a dash(—) is shown in each digital column of the numerical display device in the readout display 216. This indicates an overrange or fault condition such as unduly high test sample density, burned out exciter lamp, incorrect filter wheel position and the like.

THE MAIN TEST CAVITY AND MICRO-SWITCH STRUCTURE

Referring jointly to FIGS. 15C, 15D, 15E, 15F, 15G, 15H, 15I, 15J, the structure of the main test cavity 156 and the positions therein of the gain control switch 208, the count-up switch 218 and the count-down switch 220 will now be described.

The main test cavity 156 is defined by a rectangular sheath 156A having a flared upper rim 156B, a flared lower base 156C with dependent bosses 156C1 thereon and an axial threaded fitting 156D extending downward below the flared lower base 156C. The threaded fitting 156D is adapted to be threaded into a suitable socket (not shown) in the console 122.

The receiving area for a cuvette 120 is defined by a plurality of diagonally and symmetrically disposed guide rails 156E within the rectangular sheath 156A. These guide rails 156E extend from top to bottom of the interior of the rectangular sheath 156A and from the side walls thereof to form positions equidistant from its center.

The optical axis 156F of the main test cavity 156 extends through an optical input orifice 156G and an optical output orifice 156H which are shown as rectangular orifices formed in opposite side walls of the rectangular sheath 156A.

Figure 15C:
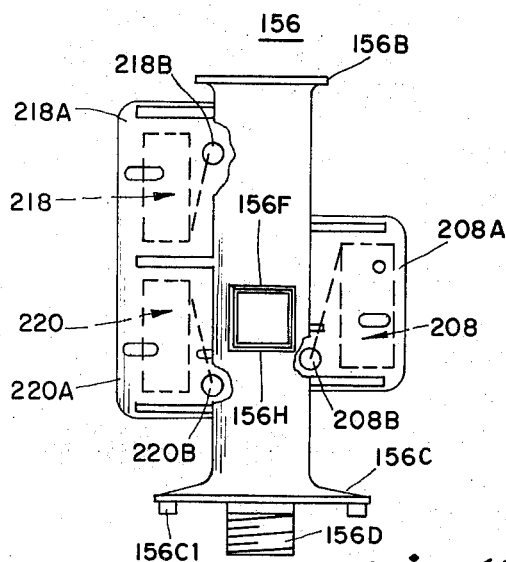
FIG. 15C is a side elevation of a main test cavity structure of the present invention as generally shown in FIGS. 13 and 14.
Figure 15D:
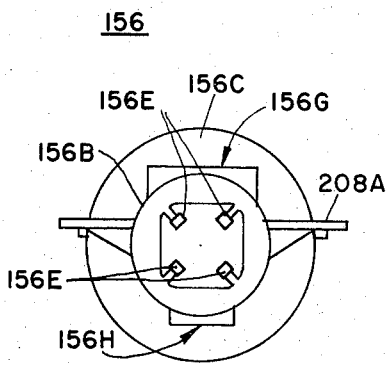
FIG. 15D is a top plan view of the test cavity.
Figure 15E:
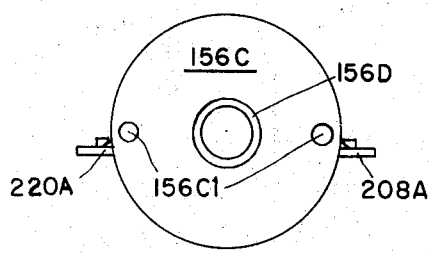
FIG. 15E is a bottom plan view of FIG. 15C.
Figure 15F:
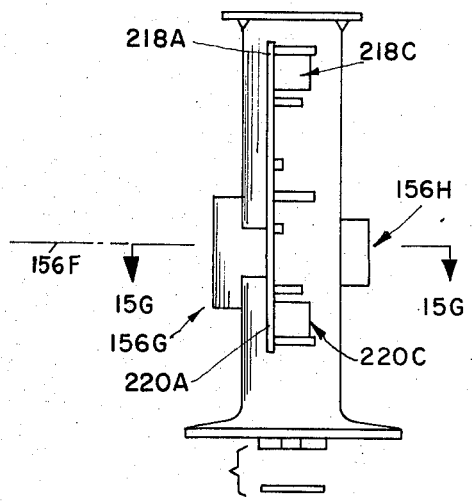
FIG. 15F is a side elevation of the structure of FIG. 15C rotated 90°.
Figure 15G:
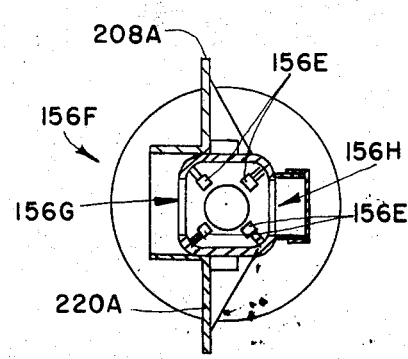
FIG. 15G is a cross-section taken along line 15G — 15G of FIG. 15F.
Figure 15H:
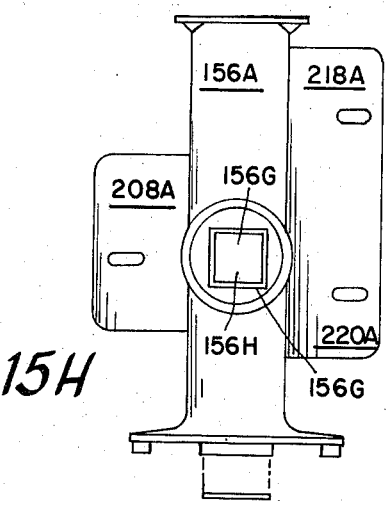
FIG. 15H is a side elevation of the main test cavity of the present invention rotated 180° from the view shown in FIG. 15C.
Figure 15I:
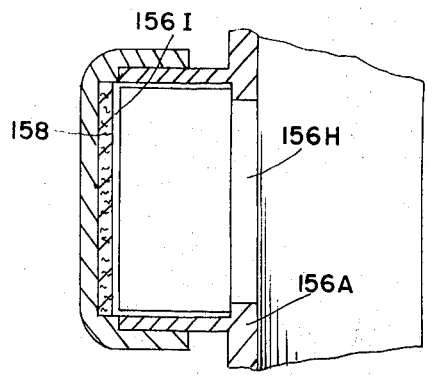
FIG. 15I is an enlarged detail of the main test photodetector and the manner in which it is affixed to the test cavity structure of FIGS. 15C through 15H.

As best shown in FIG. 15I, an infra-red cutoff filter 156I is placed across the orifice 156H over the obverse surface of the main test photodetector 158. The main test photodetector 158 in a preferred embodiment of the present invention comprises a blue enhanced silicon photovoltaic cell. The infra-red cutoff filter 156I comprises a spectral shaping filter which compresses the sensitivity range of the wave lengths to which the photodetector 158 is constrained to respond during the various constituent concentration tests of the present invention, i.e., constrains peak response to between about 400 to 600 nanometers.

Arranged perpendicular to the optical axis 156G on opposite sides of the rectangular sheath 156A is a first switch bracket 208A adapted to receive the gain control micro-switch 208 and a composite switch bracket 218A and 220A for receiving the top or count-up micro-switch 218 and the bottom or count-down micro-switch 220.

Figure 15J:
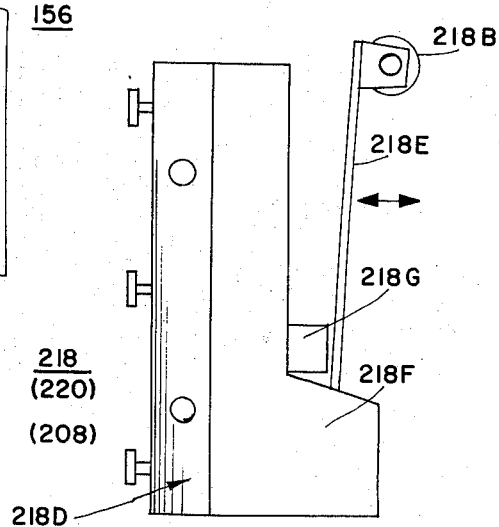
FIG. 15J is a side elevation of a typical microswitch structure of the present invention.

The structure of the micro-switches 208, 218, 220 is typically shown in FIG. 15J as including a roller actuator 218B mounted outboard of a switch body 218D on one end of a cantilever spring or arm 218E which is pivoted at its other end 218F so as to engage a switch actuating plunger 218G when the switch actuating roller 218B on the opposite end of the said arm 218E is moved inboard towards the main switch body 218D. The structure of the micro-switch 218 is identical to the structures of the micro-switches 208 and 220. Accordingly, only the structure of the switch 218 has been specifically described but like parts of the switch 218 in the schematics of the switches 220 and 208 as shown in FIG. 15C bear numerals corresponding to their respective switches but with like suffixes to those numerals on the switch 218 in FIG. 15J.

As shown in FIG. 15F, the sheath 156A includes rectangular ports 218C and 220C for permitting access of the switch actuating rollers 218B and 220B respectively to the interior of the cavity 156. A corresponding orifice 208C for permitting access of the actuating roller 208B of the gain control micro-switch 208 is provided adjacent to switch bracket 208A on the opposite side of the sheath 156A. The relative position of these access openings 208C, 218C and 220C is shown by the position of the actuating rollers 208B, 218B and 220B, respectively, in FIG. 15C.

As can be seen from FIG. 15C, the actuating roller 218B of the switch 218 is adjacent the upper and/or flared upper lip 156B of the main test cavity 156; the gain control switch 208 has its actuating roller 208B positioned just beneath the optical orifices 156G and 156H; and the count-down micro-switch 120 has its actuating roller 220B positioned on the opposite side of the sheath 156A at a position farther below the position of the actuating roller 208D.

Accordingly, the insertion of the cuvette 120 into the top of the main test cavity 156 causes the cuvette 120 to be engaged by the guide rails 156E within the cavity 156 as the cuvette 120 progresses into the cavity 156, as previously described with reference to the operation of the system 200 and its other components, the cuvette 120 progressively engages the actuating roller 218B of the count-up switch 218, the actuating roller 208B of the gain transfer switch 208 and the actuating roller 220B of the count-down switch 220, after which the cuvette 120 engages fully the bottom of the main test cavity 156 just above the flared lower rim 156C.

The purpose of the bosses 156C1 depending beneath the flared lower rim 156C is to engage a suitable reference surface (not shown) within the test console 122 such that the test cavity may be shimmed or otherwise referenced into proper position to align the optical axis 156F of the cavity 156 with the optical axis of the exciter lamp 144, collimating lens 150 and convergent lens 154 in the console 122. This will assure proper impingement of light of the proper wave length upon the main test photodetector 158 through the infra-red cutoff and shaping filter 156I.

OPERATION OF THE MAIN CONTROL CIRCUIT

Referring jointly to FIGS. 13, 14, 15C – J, 16, 17 and 20, the operation of the main control circuit 212 is as follows:

As previously described in reference to the foregoing Figures, other than FIG. 20, the count-up switch 218 comprises a micro-switch located at the top of the main test cavity 156 and is activated by the insertion of a test cuvette 120 containing a test sample 118 while the cuvette 120 is still out of the light path from the test exciter lamp 144 through the main test cavity 156 and onto the main test photodetector 158. Also, as previously described, the count-up switch 218 activates the reference or open cavity count of the test at hand.

Prior to the insertion in the main cavity 156 of the test cuvette 120, the count-up switch 218 is in its normally closed position causing the latching NAND gate 250, through its output 250B to constrain a reset condition on the counters 214 through control output line 212E3, the previously described portion of the counter control output 212E.

Now, upon activation of the count-up switch 218, to close its normally open contact, the resulting signal at the output 250B of the latching NAND gate 250, causes the first flip-flop FF1 to set, thus enabling the first output NAND gate 258 through the first output U1 of the first flip-flop FF1 and through input 258A. This enables NAND gate 258 and thereby permits the reference oscillator frequency of the oscillator signal FS, applied at the control input 212J, to be sent to the counter circuit 214 on counter control output 212E1 which consists of the output 258C of the first output NAND gate 258.

Also, at this time, the second output U1 is acting on the first input 262A of the output negative OR gate 262, resulting in energization of the output 262C thereof and the input 264A of the first inverter 264, whereupon the start conversion signal SCS1 is generated at the output 264B of the first inverter 264, the said output 264B thereof corresponding to the control output terminal 212C of the main control circuit 212. Thus, the start conversion signal SCS1 is applied to the base Q1A of the transistor Q1 in the log converter circuit 210 (FIG. 17) causing that transistor to turn OFF and initiate the start of the time interval with a corresponding initiation of the up-count in the counter 214.

At the same time, from the output terminal 250B of the latching NAND gate 250, the reset terminal RST3 of the third flip-flop FF3 is de-energized thereby allowing the subsequent setting of the third flip flop FF3 as hereinafter described.

At the completion of the time interval T the stop conversion signal SCS2 from the comparator circuit VC (control output 210D of the log converter) in FIG. 17 is applied through the control input 212D to the reset terminal RST1 of the first flip-flop FF1. This causes the first flip-flop FF1 to reset, thus stopping the up-count of the counter 214 (FIG. 16) by removing the output signal U1 from the enabling input 258A of the output NAND gate 258. Furthermore, after a short propagation delay, the ensuing removal of the second output signal U1 from the first flip-flop FF1 is removed from the output negative OR gate 262 thereby ultimately removing the start conversion signal SCS1 from the start conversion output control terminal 212C, with the consequent result that the transistor Q1 in the log converter 210 of FIG. 17 is permitted to turn ON thus resetting the log converter circuit 210 for a subsequent counting interval.

Now, as the test cuvette 120 is further inserted in the main test cavity 156, the middle micro-switch, hereinbefore identified as the gain transfer switch 208 of FIGS. 16 and 17, is activated by this cuvette 120 and causes the necessary gain change in the preamplifier circuit 204 as previously described. Then, when the cuvette 120 reaches the bottom of the cavity 156 and the unknown substance 118 is placed in the light path, all as previously described, the bottom micro-switch or count-down switch 220 is actuated to close its normally open contact and energize the second latching NAND gate 254, whereupon a signal appears at the output 254B as well as at the set input ST4 of the fourth flip-flop FF4 and at the set terminal ST2 of the second flip-flop FF2.

At the second flip-flop FF2, the setting thereof by the signal from the output 254B causes output U2 of the flip-flop FF2 to be applied to the input terminal 260A of the second output NAND gate 260, whereupon the gate is enabled and a signal appears at the output 260C thereof, the latter comprising the count down control terminal 212E2 in the counter control terminal 212E. This signal is applied to the input 214A of the counter 214 which is now constrained to count down from the previous count until such time as the second counting time interval T is complete. The time period T is commenced because of the application of the output U2 of the second flip-flop FF2 to the input terminal 262B of the output negative OR gate 262, which, as previously described, energizes the start conversion control terminal 212C to thereby apply the start conversion signal SCS1 to the log converter input 210C and the base Q1A of the transistor Q1 in FIG. 17.

When the second (down) count is complete, the comparator VC3 emits a stop conversion signal SCS2 from its output terminal 210D which is applied through the control input 212D to the reset terminal RST2 of the second flip-flop FF2, whereupon, the flip-flop is reset and the count-down enabling output U2 is removed from the input of the second output NAND gate 260, thereby stopping the counter 214 from a further down count.

At the same time, the resetting of the second flip-flop FF2 by means of the output U2 and the set terminal ST3 of the third flip-flop FF3 causes the third flip-flop FF3 to set. This results in two things. First, the second flip-flop FF2 is disabled by the output U3 acting on its data input D2 and second, the blanking signal BS, by constraint of the output U3 is removed from the display command terminal 212F to remove all blanking from the display device 216 and permit the count, i.e., the net count representative of the constitutent concentration in the unknown sample 118, to be displayed.

Upon removal of the cuvette 120 from the main test cavity 156, the resulting return to the normally closed positions of the count up switch 218 and count down switch 220 results in the resetting of the third flip-flop FF3 via the output from the first latching NAND gate 250B and the reset terminal RST3, thereby deenergizing its output U3, whereby, the decoder drivers and display device are blanked through the blanking signal control output 212F and the blanking signal input 216B on the display device 216. Also, the latch output 252B has been reset and the resulting signal is transmitted through the counter reset output 212E3 thereby resetting the counter 214 via the counter reset lead 212E3.

An additional feature of the invention is provided by the fourth flip-flop FF4. If when the latching output 254B associated with the count-down switch 220 is set, the stop conversion signal SCS2 on the line 212D is in its low state indicating that $E\lambda$ is less than $e_o$ (refer to FIGS. 16, 17 and 18), the fourth flip-flop FF4 will be reset by the output on terminal 254B of the associated NAND gate 254 which applies a signal to the set terminal ST4 of the fourth flip-flop FF4.

The fourth flip-flop FF4 was set by the first latching output 250B acting on the preset terminal PR4 of the fourth flip-flop FF4 prior to insertion of the cuvette 120 into the main test cavity 156.

The condition described above will occur if the unknown substance 118 in the test cuvette 120 is too dense to be measured (light level is below $\lambda$ cut-off as shown in FIG. 19) or if certain fault conditions exist such as a burnt out exciter lamp 144 or if an incorrect position of the filter wheel 152 has been assumed.

As a result of the reset of the fourth flip-flop FF4, a signal will appear on its output U4 which is applied to the input 266A of the second inverter 266, thereby resulting in an output control signal at the output 256B which is transmitted to the decoder driver and display device input terminal 216B1. This particular input control terminal 216B1 was previously described in connection with FIG. 16 as a general blanking input 216B. As a result of the energization of the control input 216B1 a special display such as a dash (—) in each digital position of the display device 216 is effected to indicate to the operator of the test console 122 that such a fault condition has occurred. Numerical blanking in the display 216 will automatically exist for this condition since the second flip-flop FF2 remains reset by the signal level on the stop command signal input 212D.

THE PROTHROMBIN TIME CIRCUIT AND ITS RELATION TO THE MAIN CONTROL CIRCUIT

Since the system 200 of FIG. 16 includes a counter 214 and a decoder driver and display means 216, the addition of relatively little circuitry for detection of prothrombin time parameters enables the system 200 to read prothrombin time directly on the display device 216 through selective normalized energization of the counter 214.

A prothrombin test cavity 130C, exciter lamp 132, filter 136 and a photodetector 134 for the prothrombin test have already been described in FIGS. 13 and 14, incorporated as part of the incubator block 130 in the test console 122. The additional circuitry required to test unknown samples for prothrombin time will now be described in connection with FIG. 21.

The prothrombin photodetector 134 is shown as connected to the input 234C1 of a preamplifier stage 234C in the prothrombin time circuit 234. The preamplifier stage 234C includes a second input 234C2 referenced to ground, and an output 234C3 upon which a voltage proportional to the light transmitted through the sample under test appears. A feedback resistor 234C4 is provided to complete the preamplifier stage 234C.

The output 234C3 is connected through a filter resistor 234G and a capacitor 234F to the input terminal 234D1 of an operational amplifier 234D, the latter having a second input terminal 234D2 connected to ground and an output terminal 234D3. The output terminal 234D3 is connected to the input terminal 234D1 through a feedback resistor 234E and a capacitor 234H connected in parallel one with the other. The capacitor 234F and the feedback resistor 234E comprise, in conjunction with the operational amplifier 234D, a differentiating circuit. The resistor 234G at the input and the capacitor 234H in parallel with the resistor 234E form a low pass filter circuit necessary to reject any unwanted noise and spurious fluctuations of transmittance through the unknown sample. The output 234D3 of the differentiating circuit is connected through an input resistance 234D4 to a first input 234K1 of a comparator amplifier 234K, the latter having a second input 234K2 referenced through a variable-tap resistance 234L to a source of reference potential, an output terminal 234K3 connected through a resistance 234M to the variable-tap reference resistance 234L in common with the second input terminal 234K2. The output terminal 234K3 of the comparator amplifier 234K is connected through an inverter amplifier 234P which in turn has its output comprising the prothrombin time circuit output 234B previously described in connection with FIG. 16. As shown, the output 234B is directly connected to the prothrombin time control input 212B in the main control circuit 212.

The prothrombin time control input terminal 212B of the main control circuit 212 is directly connected to the set terminal ST5 of a flip-flop FF5 having a data terminal D5 an output terminal U5 and a reset terminal RST5, the latter being directly connected in common to the reset terminal RST6 of a sixth flip-flop FF6. The sixth flip-flop FF6 has a data terminal D6 connected to a suitable source of positive bias, a set terminal ST6 directly connected to a counter control output 214C in the up/down counter 214 and an output U6 cross-coupled directly to the data terminal D5 of the fifth flip-flop FF5.

Also included in the control circuit 212 is a prothrombin time test sensing switch 270 having a normally open single-pole single-throw configuration and is positioned in the bottom end of the prothrombin test cavity 130C of FIGS. 13 and 14 in a manner substantially identical with that of the count-down switch 220 as shown and described in reference to FIG. 15C. One side of the switch 270 is connected to ground while the other side of the test sensing switch 270 is directly connected to a reference circuit junction 270A which in turn is connected through a bias resistor 270B to a suitable source of positive potential. From the reference circuit junction 270A, there is a direct connection to the input 272A of a third inverter circuit 272 in the main control circuit 212, the third inverter circuit 272 having an output 272B which is directly connected, in common, to the two reset terminals RST5 and RST6 of the fifth and sixth flip-flops FF5 and FF6, respectively.

The reference circuit junction 270A is also directly connected to a first input terminal 274A of a second output negative OR gate 274 and to a first input terminal 278A of a third output negative OR gate 278. The second output negative OR gate 274 has a second input terminal 274B which is directly connected to the counter reset output 212E3 at the NAND gate associated with the count-up switch 218 of the control circuit 212. The second output negative OR gate 274 has its output 274C directly connected to the input of a fourth inverter circuit 276 which in turn has its output directly connected to the counter control output 212E4 comprising a part of the general counter control output 212E previously described in connection with FIG. 16.

The third output negative OR gate 278 has a second input 278B which is directly connected to the blanking signal output 212F at the third flip-flop FF3 previously described in connection with FIG. 20 and an output 278C which is directly connected through a fifth inverter circuit 280, the latter having an output connection comprising a blanking signal control output 212F1 which comprises a portion or part of the general blanking control output 212F previously described in connection with FIG. 16.

The output 224A of the frequency divider 224 (the latter having its input 224B connected directly to a 60 Hz source of power as previously defined with reference to FIG. 16) is directly connected to the clock input terminal 212K comprising a first input terminal 282A of a third output NAND gate 282, the latter having a second input 282B directly connected with the output U5 of the fifth flip-flop FF5 and having an output 282C directly connected as a first input 284A of a fourth output negative OR gate 284.

The fourth negative OR gate 284 has a second input 284B which is directly connected to the counter control output 212E1 at the first output NAND gate 258, and an output terminal 284C which comprises a counter control output terminal 212E5 forming a part of the general counter control output 212E of the main control circuit 212, previously described with reference to FIG. 16.

The counter control output 212E5 is directly connected to the counter control input 214A of the up/down counter 214. The up/down counter 214 has a control output terminal 214C which is directly connected to the set terminal ST6 of the sixth flip-flop FF6.

This connection is for the purpose of inducing a delay before measurement of prothrombin time is made for the purpose of rejecting perturbations in the sample caused by the addition of the plasma. A four second delay to allow the perturbations to settle down has been found to be sufficient. This delay is accomplished by means known in the art.

OPERATION OF THE PROTHROMBIN TIME CIRCUIT

Referring jointly to FIGS. 13, 14, 16, 20 and 21, the light passing through the thromboplastin-plasma mixture in a suitable cuvette mixture 118 and a suitable cuvette 120, when the cuvette 120 is placed in the test cavity 130C of the incubator block 130, illuminates the prothrombin photodetector 134 generating a current at the input 234C1 of the preamplifier stage 234C, the latter producing a voltage at the output terminal 234C3 thereof proportional to the light transmitted through the mixture 118. This voltage is differentiated by the differentiating circuit consisting of the amplifier 234D, resistor 234E and capacitor 234F. As previously described, the resistor 234G and capacitor 234H form a low pass filter for the rejection of noise.

As the transmitted light decreases due either to the addition of plasma or the clotting of the thromboplastin-plasma mixture, the voltage at the output terminal 234D3 of the differentiator circuit will increase in a manner proportional to the time rate of change of transmitted light through the mixture 118.

At a threshold determined by the reference voltage on the second input 234K2 of the reference comparator amplifier 134K, said voltage being set by the variable resistor 234L, the comparator 234K will send a set command to the fifth flip-flop FF5 through the inverter circuit 234P via the prothrombin time control input 212B and the set terminal ST5 of the said fifth flip-flop FF5. In the comparator circuit, the previously described resistor 234M produces a threshold hysteresis function necessary to reject any noise applied to the first input 234K1 of the comparator amplifier 234K.

The prothrombin cuvette detector switch 270 located in the bottom of the prothrombin test cavity 130C is activated upon insertion of the cuvette 120 containing the thromboplastin-calcium mixture 118 into the cavity 130C. Prior to this insertion, the fifth and sixth flip-flops FF5 and FF6 are maintained in a reset condition through their common reset terminal connection with the output 272B of the third inverter circuit 272. Upon insertion, this reset is disabled by the closing of the detector switch 270 and the second negative OR gate 274 is enabled causing the fourth inverter 276 to provide a disabling signal at the counter reset command output 212E4, leaving the counters 214 with all zeros in each digital position. Furthermore, the third output negative OR gate 278 is enabled causing the blanking signal preset at the display control output 212F1 to be removed by the fifth inverter circuit 280. Therefore, no blanking is present on any of the display devices 216.

The following events now occur in the following time sequence:

First, when plasma to be tested is added to the thromboplastin-calcium mixture in the test cuvette 120, the resulting sudden variation in light transmittance detected by the prothrombin photodetecter 134 creates a set command at the output 234B of the prothrombin time circuit and correspondingly at the prothrombin control input 212B of the main control circuit 212, thereby setting the fifth flip-flop FF5 through its set terminal ST5 since the sixth flip-flop FF6 stands reset and its output U6 (and signal applied therefrom to the data terminal D5 of the fifth flip-flop FF5) is in its high state. This will enable the third output NAND gate 282 to gate the 10Hz clock through its output terminal 282C to the first input terminal 284A of the fourth output negative OR gate 284, thereby applying counting pulses through the counter control output 212E5 to the counter control input 214A. Thus, the counters will begin timing the count in one-tenth of a second increments if we assume that there are three up/down counters with a maximum time span of 99.9 seconds and one decimal position for the digital readout in the display device 216.

After a 4 second interval which is controlled by the delay control output 214C connected directly to the sert terminal ST6 of the sixth flip-flop FF6, as will be hereinafter more fully described, the counter 214 will generate a command on the delay control output 214C and will cause the sixth flip-flop to set.

As the clot begins to form and the comparator amplifer 234K senses that the signal received from the differentiator circuit output 234D3 has reached the threshold value set by the variable resistance 234L at the second input 234K2 of the said comparator 234K, the fifth flip-flop FF5 will be clocked to reset since the signal level at the output U6 of the sixth flip-flop FF6 as applied to the data terminal D5 of the fifth flip-flop FF5 is now in its low state. This disables the third output NAND gate 282, stopping the count by precluding further transmission of clocked pulses therethrough to the output negative OR gate 284 and the count now in the counter 214 will indicate, to the nearest tenth of a second, the actual prothrombin time.

Because of the previously described connection 214B directed to the decoder drivers and display circuit device 216, the count in the counter 214 is read out directly by the operator of the test console 122 as the correct prothrombin time normalized to seconds and tenths of seconds.

All counters 214, and the fifth and sixth flip-flops FF5 and FF6 are automatically reset upon removal of the prothrombin test cuvette 120 from the test cavity 130C by deactivation of the cuvette detecting switch 270, which by opening, disables the second and third output negative OR gates 274 and 278 and causes the third and fourth inverter circuits 276 and 280 to generate reset and blanking pulses on the control outputs 212E4 and 212F1 of the main control circuit 212, respectively.

A PREFERRED COMMERCIAL EMBODIMENT

Figure 22:
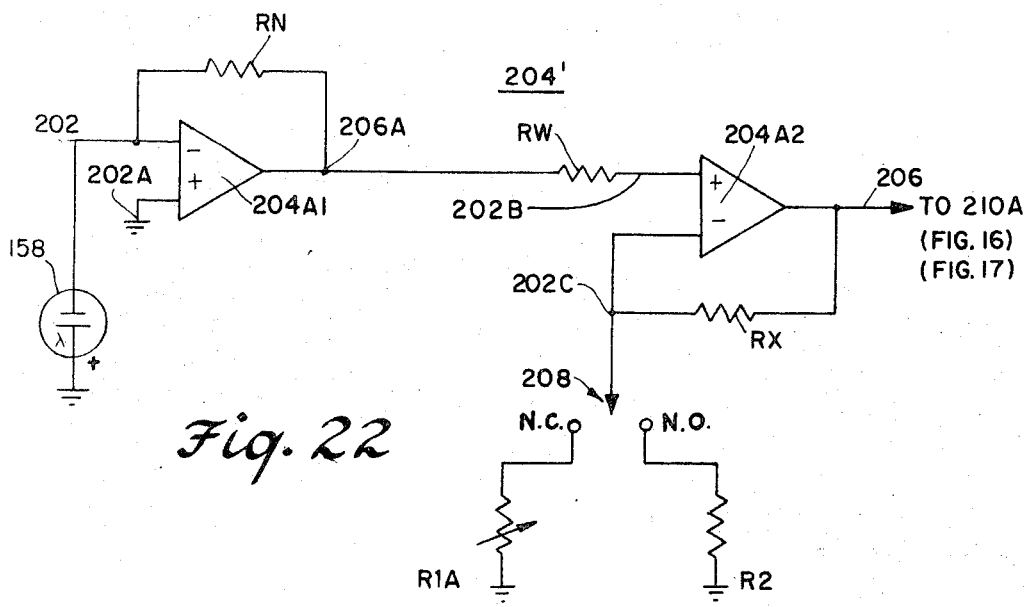
FIG. 22 is a circuit schematic of a preferred commercial embodiment of the photodetector preamplifier generally illustrated in FIG. 16.

Referring to FIG. 22, a preferred commercial embodiment of the preamplifier stage 204, previously described in connection with the preamplifier and log converter circuits of FIG. 17 will now be described.

In the embodiment of FIG. 22, the operational amplifier 204A of the embodiment of FIG. 17 is now shown as including a normalization stage 204A1 and a gain transfer stage 204A2. The normalization stage 204A1 includes a normalization feedback resistor $R_N$ connected from the output 206A of the normalization stage 204A1 back to the input 202 to which is connected the main test photodetector 158 as previously described.

The output 206A of the normalizations stage 204A1 serves as an intermediate output terminal in the embodiment of FIG. 22 and is connected through an input resistance RW to a first input terminal 202B of the gain transfer 204A2, the latter having an output 206 corresponding to that output 206 previously described in FIG. 17 and a second input terminal 202C corresponding to the connection with the gain transfer switch 208 (middle micro-switch) previously described in FIG. 17. A fixed feedback resistance RX is connected between the preamplifier output 206 and the second input terminal 202C of the gain transfer stage 204A2.

The gain transfer switch 208 is still shown as including a normally open terminal from which the offset resistor R2, previously described is connected to a ground reference. The micro-switch 208 also includes a normally closed contact terminal from which a cavity correlation adjustment resistance R1A, similar to the previously described resistance R1, is connected to a ground reference. Accordingly, when the gain transfer or middle micro-switch 208 is shifted from its normally closed position to its normally open position and vice versa, the gain is selectively varied, thus modifying the output voltage $E\lambda$ accordingly. The operation of the preferred commercial embodiment 204' of the preamplifier circuit 204 will now be described by first referring back to the previously defined equations in conjunction with the circuit of FIG. 22.

From Eq. 15a and 12b
$P_o = (R1/R2) P_{oc}$
$T_{oc} = P_{oc}/P_{in}$
From Eq. 15
$C_v = 2.3026 f (R3C1/B) \log (R1/R2) (T_{oc}/Tu)$
A problem frequently encountered in any practical application of this invention is that the relationship $P_o$ to $P_{oc}$ may vary from instrument to instrument due to slight differences in the optics: lamp position, lens focal lengths, beam geometry and photocell transfer function.

Stated in another way $T_{oc}$ is not constant between instruments or may vary slightly with diverse application and lamp replacement. Correction for this variation could be made by chainging the ratio (R1/R2) as seen in Eq. 15a.

However, all test function modules 122A must be interchangeable with any instrument console 122. Therefore, such corrections cannot be made on these modules, but must be made in the instrument console. A solution to this problem is the replacement of the photocell preamplifier 204 of FIG. 17 with the circuit 204' shown in FIG. 22.

The normalization stage 204A1 normalizes $E\lambda$ for the various filters used. Since each filter transmits varying light power, this stage compensates for these variations by causing $E\lambda$ for open cavity to remain at an approximately constant value for every filter. This is accomplished by changing the gain of the normalization stage 204A1 with the normalizing resistor RN. This resistor is located on the test function modules 122A and has a specific value for each filter in the filter wheel 152.

The gain transfer stage 204A2 has two gains, one for open cavity and one for filled cavity, the gain transfer being made by the gain transfer switch (middle micro-switch) 208. For open cavity, the cavity correlation adjustment resistor R1A is located in the console 122, not on the test modules 122A and is adjusted to equate the open cavity to a distilled water blank. This is done by using some standard resistance for the offset resistor R2 whose value determines the filled cavity gain. The adjustment of open cavity gain by R1A is made to cause the same count for open cavity as that count obtained with distilled water (standard reference) in the cavity using the filled cavity gain control resistor R2. Thus the display is made to read zero.

Now, the development of Eq.'s 5 through 15 can be modified to reflect the above parameters.

If $A_N$ = gain of first stage (per $R_N$)
$A_O$ = gain of second state, open cavity (per R1A)
$A_F$ = gain of second state, filled cavity (per R2)
Eq. 11 may be modified:
$C_{oc} = 2.3026 f (R3C1/B) \log (A_N A_O K\lambda P_{oc}/e_o)$ 17.

Eq. 12 may be modified:
$C_{cc} = 2.3026 f (R3C1/B) \log (A_N A_F K\lambda P/e_o)$ 18.

Rewritten in terms of Eq.'s 12b we obtain modified Eq.'s 12 and 13:
$C_{oc} = 2.3026 f (R3C1/B) \log (A_N A_O K\lambda P_{in} T_{oc}/e_o)$ 19.
$C_{cc} = 2.3026 f (R3C1/B) \log (A_N A_O K\lambda P_{in} T_u/e_o)$
Eq. 15 modified then becomes:
$C_v = 2.3026 f (R3C1/B) \log (A_N A_O/A_N A_F) (T_{oc}/T_u)$ 20.

Note that the gain $A_N$ of the first stage does not affect the answer. It's purpose is only to constrain the operation of the circuits of the present invention to their linear regions.

To allow for a reagent blank offset it is only necessary to change the gain $A_F$ with the offset resistor R2. Therefore, this resistor is also located on the Test Function Modules 122A. As in Eq. 15, the effect of this change is to translate the concentration line $C_v$ of FIG. 19 left or right.

COUNTER, DRIVER, DECODER AND DISPLAY CIRCUITS

The counting previously described in general reference to counter circuit 214 is accomplished by three binary coded decimal (BCD) up/down counters 214X, 214Y and 214Z, all connected in serial cumulative arrangement. These counters are provided with a common reset connection 300 which extends to the reset control output terminal 212E4 of FIG. 21. The common connection 300 gang connects the reset terminal 302X, 302Y, and 302Z, respectively. of the up/down counters 214X, 214Y abd 214Z.

The counters are also provided with a common disabling connection 304 which is gang connected to the data loading terminals 306X, 306Y and 306Z, respectively, of the counters 214X, 214Y and 214Z since the data loading feature of the counters is not to be used. The common disabling connection 304 is inhibited by connection to a suitable source of bias such that the data loading feature of the counters is inhibited.

The first counter 214X includes count-up input CUX and count-down CDX which are part of the generally described counter input terminal 214A. The count-up input CUX is directly connected to the output control terminal 212E5 of FIG. 21. The count-down input CDX is connected directly to the count-down output control terminal 212E2 of FIG. 20 to be energized thereby during constituent concentration tests.

The second counter 214Y has a count-up input CUY and a count-down input CDY connected to the corresponding outputs of the first counter 214X and the third counter 214Z has a count-up input CUZ and a count-down input CDZ connected to corresponding outputs of the second counter 214Y in conventional serial fashion. For example, in the present embodiment the function of each counter is to progress through one decade.

The counters 214X, 214Y and 214Z through output leads 214B are connected to the inputs 216A of decoder driver circuits 216U, 216V, 216W, respectively. These decoder drivers are connected through a plurality of current limiting resistors 308X, 308Y and 308Z, respectively, to the input terminals of digital display modules 216X, 216Y and 216Z. These digital displays comprise seven bar character displays of the light emitting diode type.

The decoder and driver circuits 216U, 216V and 216W are respectively connected to the blanking signal input 216B of the decoder driver and display circuit 216 by means of inverter amplifiers 310U, 310V and 310W, respectively, having their inputs connected to the terminal 216B and their outputs respectively connected to blanking terminals 312U, 312V and 312W of the driver decoder circuits.

At this time it should be understood that the counter 214X counts the least significant digit, counter 214Y the middle digit and counter 214Z the most significant digit. Accordingly, the driver and decoder circuits 216U, 216V and 216W are interconnected as is conventional in the art.

As a result, the display 216X displays the least significant digit with or without the provision of a decimal point; the display 216Y provides a readout of the middle digit; and the display 216Z provides a readout of the most significant digit.

The least significant digit display 216X includes a decimal point input DX which is connected through a gate 314 enabled in a manner well known to the art utilizing decimal point command diode 170A to be hereinafter more fully defined with reference to FIG. 24. At this time, suffice it to say that the diode 170A is included selectively in a given test module 122A so that the proper scaling of the readout is accomplished by selectively commanding the appearance of a decimal point between the least significant and middle digit displays.

In operation, for prothrombin time tests, only the count-up input CUX is energized from the control output 212E5 of the main control circuit 212 as constrained by the prothrombin time circuit 234. These interconnections between the prothrombin time circuit 234 and the main control circuit 212 have already been described with reference to FIG. 21.

In regard to the counter and display operation for a constituent concentration test, during the first or up count, the clock frequency is gated by the main control circuit 212 via its control output terminal 212E5 (FIG. 21) onto the count-up terminal CUX of the least significant digit counter 214X and the counters 214X, 214Y and 214Z count-up.

When the second count is commanded during the test cycle as previously described, the second count is achieved in reverse, subtracting from the first count by imposing the clock counting frequency on the count-down terminal CDX of the least significant digit counter 214X from the control output terminal 212E2 of the main control circuit 212 (FIG. 20).

The resulting number in the counters 214X – Z is the desired concentration value as previously described in connection with the general description of the system 200 in FIG. 16. This count is decoded to a seven bar presentation by the decoder drivers 216U – W. These decoder drivers have blanking features well known in the art and the common blanking achieved by means of the common lead 216B feeding the driver inverters 310U – W and applying blanking signals to the terminals 312U – W is well known in the art. This common connection through the blanking input terminal 216B blanks the entire display until the completion of the second count at which time the blanking signal BS is removed and the concentration value is displayed.

In order to provide the proper scale factor in conjunction with the selected clock frequency or reference frequency for making the count, the presence of absence of a decimal point between the least significant and middle digit shown on the displays 216X and 216Y, respectively, is effected by the gate 314 acting through the decimal point input DX of the least significant digit display 216X as previously described. The actual implementation of the decimal function is created by simple logic known in the art using a logic command derived from the presence or absence of a decimal point command diode 170A on the test function modules 122A (FIG. 24).

TEST FUNCTION SELECTION AND SWITCHING MATRIX FOR THE TEST FUNCTION MODULES

Those component circuits of the present invention which include selectively switched variables for normalization of the testing system 200 to the particular test at hand have already been described with reference to FIGS. 16, 17, 20 and 21 and 23. In these circuits, it has been clearly disclosed that the several actuated positions of the filter wheel 152 are controlled by insertion of a preselected value of resistance RS; the reference frequency of the oscillator 222 is controlled by selective insertion in that oscillator of a specific value of resistance RC; the reagent offset is controlled by selective insertion of a resistance R2 in the photocell preamplifier 204 adjacent to the gain transfer switch 208; and the normalization of the entire system to compensate for variations in filter transmittance is accomplished by selectively switching a known value of resistance RN into the photocell preamplifier 204, specifically, in the normalization stage 204A1 thereof.

Figure 24:
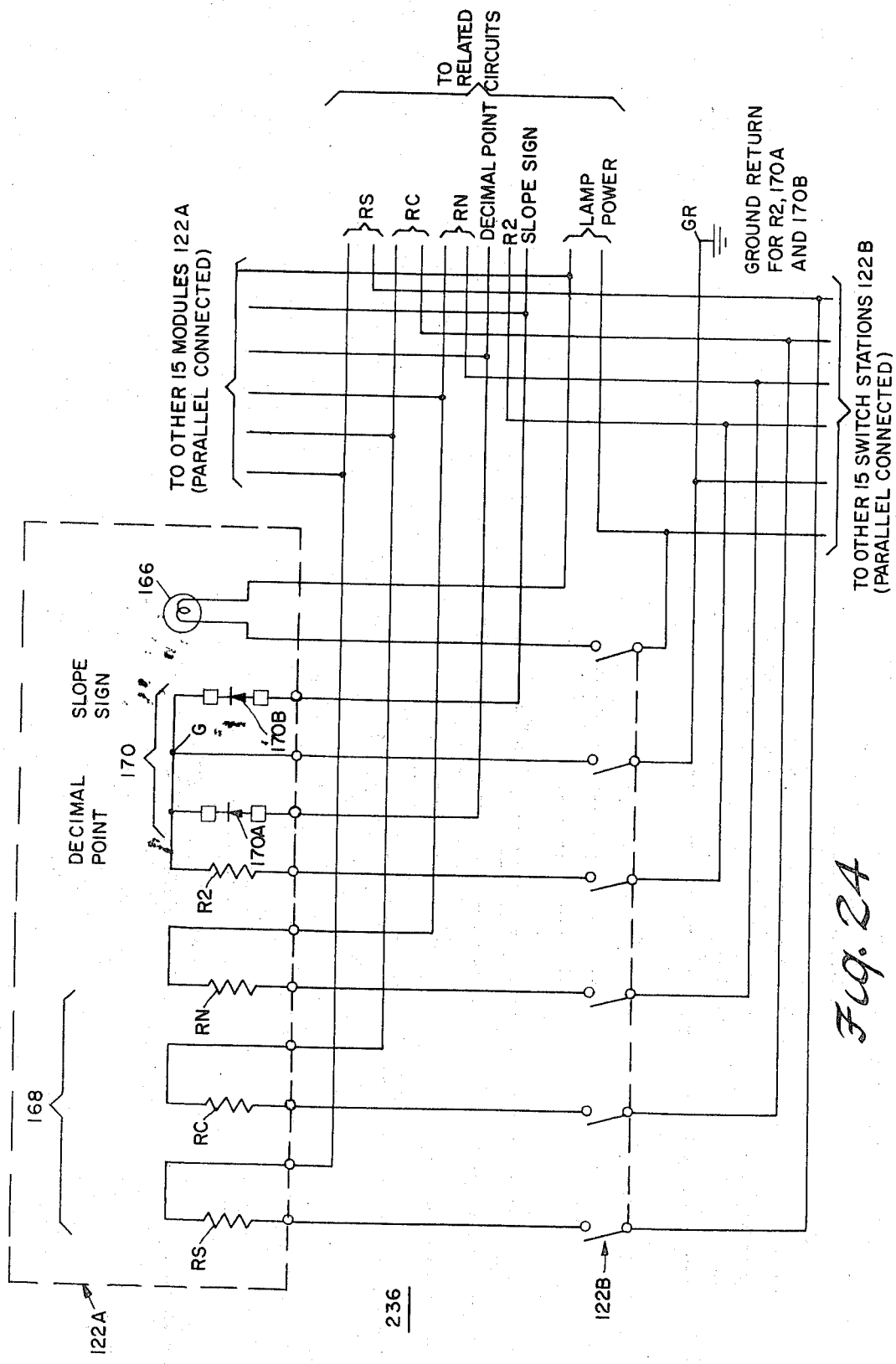
FIG. 24 is a schematic diagram of the switching matrix and its association with the balance of the system and individual test function modules generally illustrated in FIG. 16.

Referring now to FIG. 24, the specific interrelationship of a test function module 122A with the switching matrix 236 including the test selection switches 122B will now be described.

The test function module 122A is shown in FIG. 24 as including the resistors RS, RC, RN and R2, each having one end thereof connected to an individual normally opened contact of a gang connected single pole, single throw switch comprising the test select switch 122B for that module. Also connected to another individual normally open contact of the test selection switch 122B by means of a common connection G is the other side of the resistor R2 as well as one side of each of two diodes 170A and 170B, controlling, respectively, the decimal point logic and slope sign logic of the testing system 200.

The last connection to an individual normally open contact of the test switch 122B is made to one side of the test module indicator lamp 166.

The other side of the resistor RS, the resistor RC, the resistor RN, and the first and second diodes 170A and 170B and the other side of the module indicator lamp 166, are all connected through individual leads to common interconnection lines with each of the other modules 122A of the test console 122 as well as to common external circuit connections by which the resistor RS, the resistor RC, the resistor RN, the decimal point control diode 170A, and a slope sign control diode 170B and the indicator lamp 166 are all connected to their respectively related circuits as previously described in connection with FIGS. 16, 17, 20, 21, 22 and 23.

The opposite side of the test select switch 122B for the particular module 122A shown in FIG. 24 has its individual poles connected to a plurality of parallel common leads extending to the other test select switches 122B in the console 122 in identical manner to that shown for the particular test function module 122A of FIG. 24. The pole opposite the common ground connection G in the test select switch 122B is connected to a ground return GR for the resistor R2, diode 170A and diode 170B.

Therefore, the necessary normalizing components for any given test are switched into their respective circuits from their location on the test function modules 122A by means of the test select switches 122B, one for each such test function modules 122A, which comprise six pole interlocked push-button switch devices.

The only function which has not been previously described is that of the slope sign command diode 170B. This will now be described in conjunction with FIG. 25 which relates to that condition in which a negative slope sign is characteristic of the transfer function of a given concentration test.

NEGATIVE SLOPE

There exists in some photometric measurements a condition where concentration varies inversely with absorbence. To affect such a measurement it is only necessary to reverse the order of counting described in the system concept.

Figure 25:
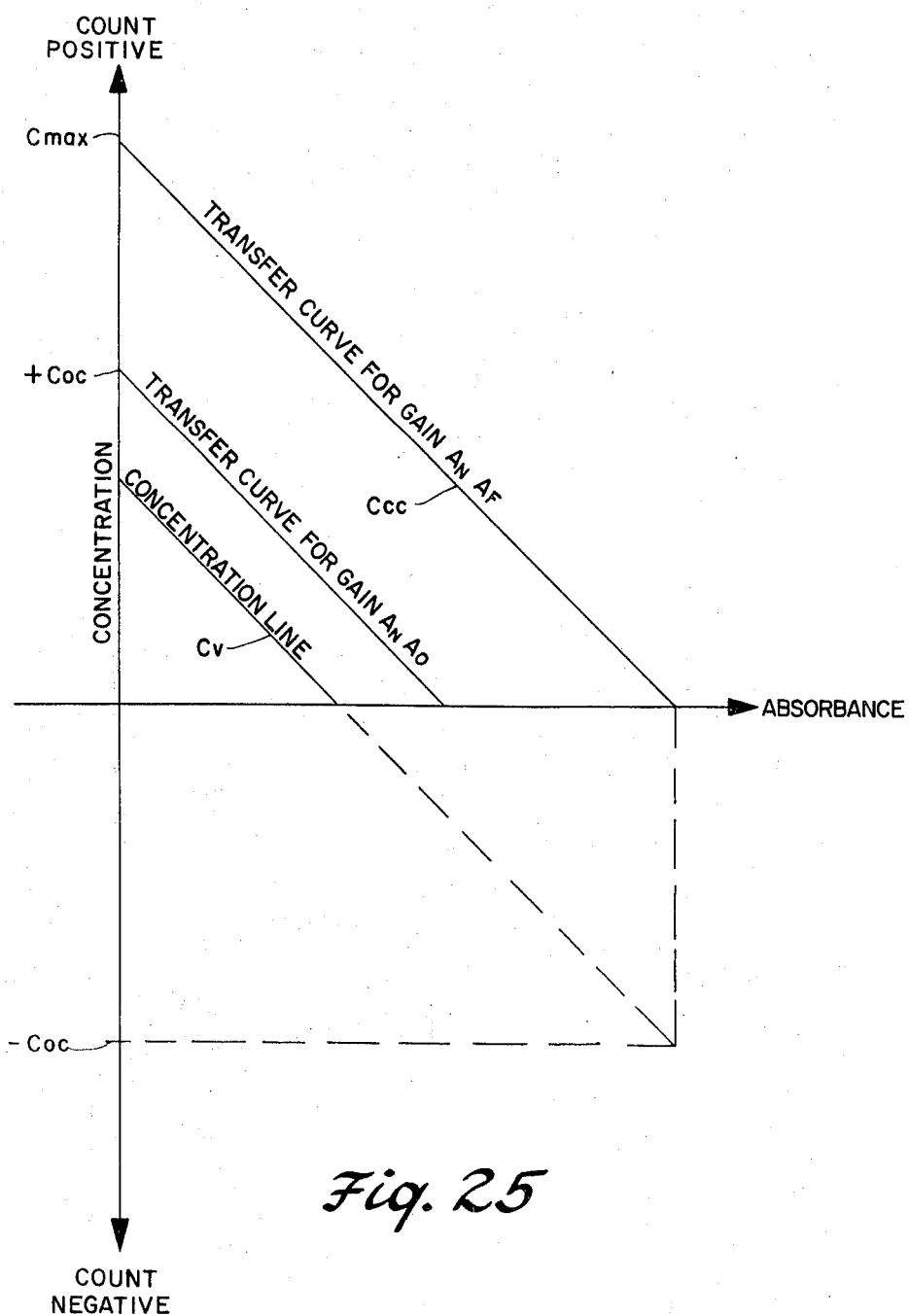
FIG. 25 is a graphic representation of concentration versus absorbance for constituent concentration tests having negative slope characteristics.

Relating this discussion to the embodiments of FIG. 22, with the open test cavity 156, the first count is made down from zero. This gives a first count number $C_{oc}$ that is in effect negative. The second count $C_{cc}$ with the unknown substance in the light path is made upward, in effect adding to the initial count $-C_{oc}$. The resulting concentration line $C_v = -C_{oc} + C_{cc}$ is shown in FIG. 25.

Since a count limit exists for a given frequency due to the finite range of T (all parameters in the practical application must be kept in the amplifier's linear operating region), the total gain $A_N A_F$ must not allow the count to exceed the limit $C_{MAX}$ for a maximum light condition (open cavity may be considered as the maximum light condition). Since $A_O$ is fixed for any given instrument, $A_N$ must be reduced sufficiently to assure the above conditions.

The implementation of this negative slope requires only that the outputs 258C and 260C from the first and second output NAND gates of the main control circuit 212 of FIG. 20 be reversed. This is effected by simple logic circuitry controlled by the slope sign diode 170B, which is known in the art and as such need not be defined. The logic command which governs the clock reversal is derived on the test function modules.

FILTER POSITIONING SERVO

Figure 26:
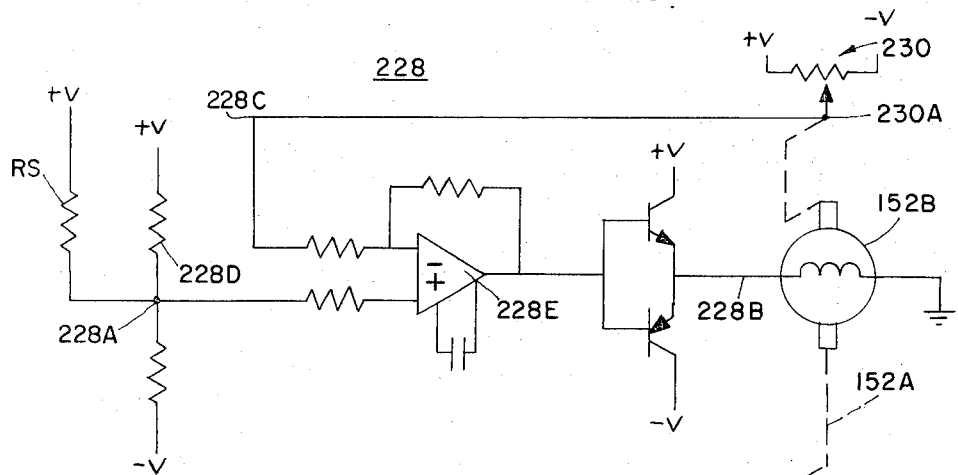
FIG. 26 is a more detailed schematic of the filter wheel servo control circuit 228 generally shown in FIG. 16.

Each test is made at an appropriate light wavelength. The selection of the proper filter for constituent concentration test is accomplished by the servo shown in FIG. 26. This circuit is well known in the art and need not be described except to point out its unique features as associated with the test system 200. The servo system will position the filter wheel 152 such that the voltage on input 228C approximately equals that on input 228A of the operational amplifier 228E. The voltage on input 228A is changed by the filter selection resistor RS located on the test function modules 122A. These resistor values are selected so as to produce a voltage on input 228A equal to the voltage on input 228C with the proper filter on the filter wheel 152 in position. A damping resistor 228D is provided such that if the resistor RS is disconnected (all test select pushbuttons 122B UP) the servo will not run "open loop". Furthermore, to save components the most frequently used filter is designed to be positioned with the filter selecting resistor RS disconnected and for this wavelength, this resistor RS is deleted from the test function module 122A associated with those tests requiring that filter.

INCUBATOR TEMPERATURE CONTROLLER

The incubator temperature controller 232 previously described in general terms with reference to FIG. 16 will now be more fully described with reference to FIG. 27.

Figure 27:
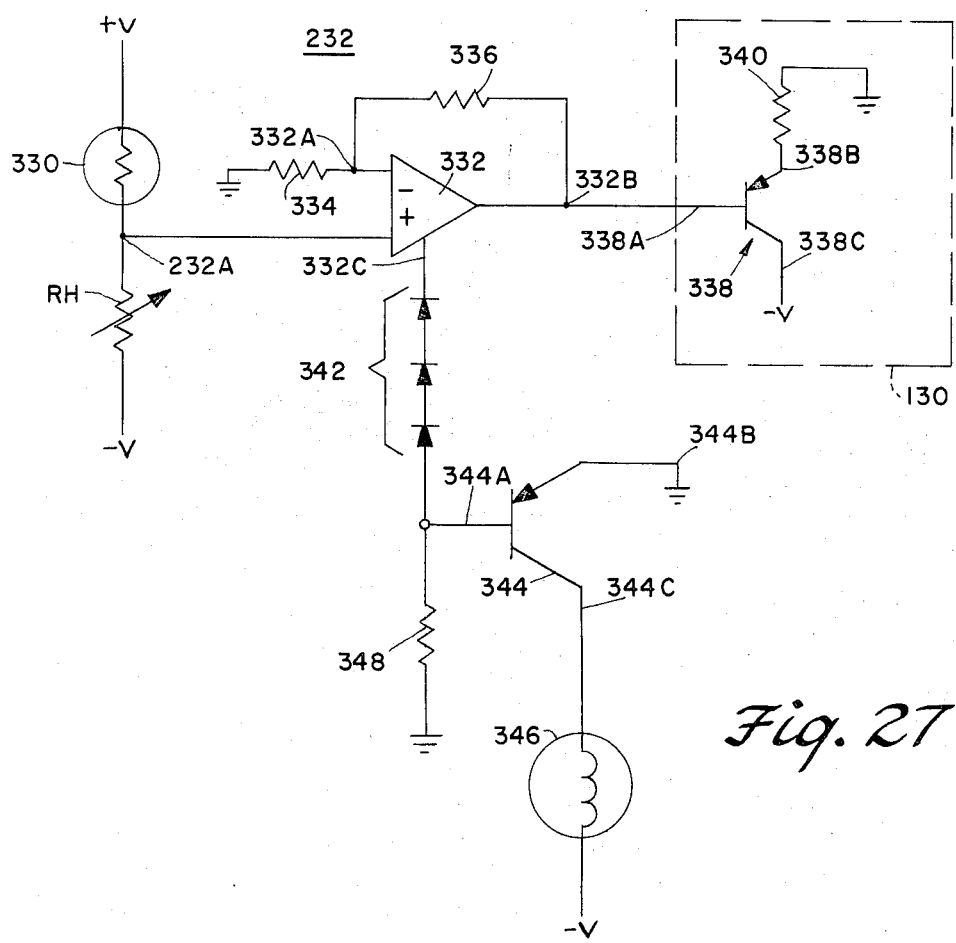
FIG. 27 is a more detailed schematic circuit diagram of the incubator heat control circuit generally shown in FIG. 16.

Like elements in FIG. 27 will bear like numerals to those elements previously disclosed in FIG. 16.

The temperature control resistor RH is shown as a variable resistance connected in a voltage dividing configuration with a thermistor 330, having the common terminal therebetween comprising the first input 232A of an operational amplifier 332. The voltage divider configuration of the thermistor 330 and temperature control resistor RH is symmetrically biased.

The operational amplifier 332 has a second input 332A which is connected through a resistance 334 to ground and which is also connected to the output 332B of the operational amplifier 332 through a feedback resistance 336.

The thermistor 330 is coupled to the incubator block 130 in a heat exchanging relationship so that it will thereby sense the temperature of the incubator block.

The output 332B of the operational amplifier 332 is connected to the base terminal 338A of a power transistor 338 which is connected or mounted on the incubator 130 such that the incubator 130 serves as a heat sink for the said power transistor 338.

The emitter terminal 338B of the power transistor 338 is connected from ground through a control resistance 340 and the collector terminal 338C of the power transistor 338 is connected to a source of negative voltage.

The operational amplifier 332 has a clamping input 332C which is connected in the reverse direction through a string of clamping diodes 342 to the base terminal 344A of a switching transistor 344 having its emitter 344B connected to ground and its collector terminal 344C connected through a low temperature indicator lamp 346 to a source of negative voltage.

In operation, the temperature controller 232 is designed to maintain the incubator block 130 at a temperature of 37°C. The temperature control resistor RH is adjusted such that with the thermistor 330 at 37°C, the voltage at the input 232A of the operational amplifier 332 when amplified by the closed loop gain $A_T = (R336 + R334)/(R334)$ gives a voltage at the amplifier output 332B and at the emitter terminal 338B of the power transistor 338 such that sufficient current will flow through the resistor 340 and the power transistor 338 to cause that transistor 338 to dissipate the quiescent power necessary to maintain the incubator block 130 at 37°C.

As the temperature of the incubator block 130 decreases, the voltage on the input 232A of the operational amplifier 332 will decrease (thermistor 330 has a negative temperature co-efficient) causing the voltage at the emitter 338B to thereby decrease. This causes an increase in current and power dissipation in the power transistor 338. As this condition continues, the voltage at the base terminal 338A of the power transistor 338 is reached, below which it cannot decrease further due to the clamping action of the diode string 342 and the base - emitter junction of switching transistor 334. The temperature corresponding to this voltage is the threshold between a heater full-on condition (a maximum power that power transistor 338 can dissipate is at this point) and a proportional closed-loop system. This temperature is chosen very close to the 37°C control temperature (approximately 36.5°C) and is determined by the closed-loop gain $A_T$.

As the operational amplifier 332 goes into a clamp condition, current flows into the amplifier 332 via the amplifier clamping input 332C. This current flow is detected and amplified by the switching transistor 344 thereby causing the low temperature indicator lamp 346 located in the temperature control module 126 to illuminate and indicate to the operator of the console 122 of FIGS. 13 and 14, that a low temperature condition exists in the incubator block 130.

EXAMPLES OF COMPONENTS

| Reference Designation | Description | Commercial Examples |
|---|---|---|
| 1. 204A, 210G, 204A2, 234C | Operational Amplifier | Motorola MC1458 |
| 2. 210F, 228E, 332 | Operational Amplifier | National LM 301A |
| 3. 234D, 204A1 | Operational Amplifier | National LM 312H |
| 4. VC3, 234K | Comparator | Motorola 1458 with output clamped to TTL levels |
| 5. 214X, 214Y, 214Z | BCD Up-Down Counter | TI SN74192 |
| 6. 216U, 216V, 216W | Decoder-Driver | TI SN7447 |
| 7. 216X, 216Y, 216Z | 7 Bar L.E.D. Display | Monsanto MAN-1 |
| 8. 264 (typical) | Inverter | TI SN7404 |
| 9. 258 (typical) | FF1, Gate | TI SN7400 |
| 10. FF1, FF2, FF3, FF4, FF5, FF6 | Type D. Flip-Flop | TI SN7474 |
| 11. 224 | ÷6 Counter | TI SN7492 |

The foregoing examples show the commercial availability of the various electronic components utilized in constructing the testing system 200.

Any of the circuitry not disclosed in detail herein is commercially available and known in the art.

As can now be readily seen from the foregoing specification and drawings, the present invention provides a colorimetric blood constituent and prothrombin time analyzer which significantly enhances such analyses and materially reduced errors commonly encountered in the prior art. The invention further makes possible the performance of a heretofore unobtainable variety of such analyses with optimally minimum equipment cost.

The novel system of the present invention for effecting these analyses cancels out normally encountered variables such as exciter lamp intensity, photodetector transfer functions and foreign matter in the optics and is self nomalizing such that all tests values can be displayed on a common digital readout scale or the like, already scaled to the proper units of concentration values and time.

Furthermore, the new and novel console structure of the present invention provides for interchangeability of one set of test parameters with another to thereby selectively vary the ultimate number of analyses which can be performed by the system of the present invention.

What is claimed:

1. In direct reading digital filter photometers for use in performing a plurality of chemical analyses of liquid samples, wherein the concentration of a specific constituent of a sample for each particular analysis is proportional to the intensity of radiant energy of a particular frequency range transmitted through a sample, the combination including:

a source of radiant energy;

filter means for following a particular frequency range of radiant energy emitted from said source;

transducer means positioned to be responsive to said filtered radiant energy from said source and for generating a signal proportional to the intensity of said filtered radiant energy;

receptacle means for supporting a cuvette containing sample liquid to be analyzed in said path of radiant energy;

electrical digital readout means for providing a readout as a function of the intensity of said received radiant energy;

analog-to-digital computing circuit means for deriving and generating a signal proportional to the concentration of said constituent to be analyzed in said liquid;

assembly means comprising a plurality of electrical normalizing means comprising calibrated reference parameters for each constituent test, and a plurality of associated individual filter means;

each of said normalizing means being selectively electronically connectable with said computing circuit means for providing electrical reference parameters for said computing circuit means for constraining said readout means to provide a direct digital readout of the concentration of a specific constituent related to a particular analysis in response to the intensity of radiant intensity received from said source through a particular one of said filter means, each of said normalizing means being selectively connected with a particular one of said filter means; and correlating means for selectively correlating said normalizing means with said readout means and said filter means for performing each said particular analysis.

2. The invention defined in claim 1, wherein said receptacle means comprises:

an elongated hollow sheath having optical apertures in opposite sides thereof defining an optical path therethrough transverse the longitudinal axis thereof;

guide means for receiving and constraining a cuvette containing a test sample in a substantially symmetrical intersection with said optical axis; and switch means mounted on said sheath for engaging a cuvette inserted therein for detecting the presence and position of a cuvette and test sample in said sheath and exerting a constraint on said testing means as a function of such presence.

3. The invention defined in claim 2, wherein said switch means comprises:

a first micro-switch mounted on said sheath sensing the initial insertion of a cuvette therein before said cuvette intersects said optical path;

a second micro-switch mounted on said sheath sensing the intermediate insertion of said cuvette therein subsequent to the intersection of said cuvette and said optical path; and a third micro-switch mounted on said sheath sensing the substantially complete insertion of said cuvette therein.

4. In a direct reading filter photometer for performing a plurality of chemical analyses of liquid samples irradiated by light of preselected wavelengths, including constituent concentration and prothrombin time analyses, the combination comprising:

circuit means including detector means responsive to the instantaneous intensity of light transmitted through a sample for providing outputs representative of a constituent concentration and also selectively responsive to a change in the intensity of light transmitted through a sample for providing outputs representative of prothrombin time values;

converter means for converting said outputs to digital signals representative thereof; and display means for receiving said digital signals for converting same to direct numerical readouts of said constituent concentrations and prothrombin times.

5. The invention defined in claim 1, wherein said normalizing of means comprises a plurality of circuit modules, each including a given set of said reference parameters, peculiar to a given analysis to be performed and selectively interconnected with said correlating means to effect a particular analysis.

6. The invention defined in claim 5 wherein said modules are selectively removable and replaceable in said assembly means to selectively vary the number of analyses performed.

7. A test console for performing liquid sample analysis by absorption photometry comprising:

a housing, including test sample receiving means;

radiant energy means and optical means in said housing for irradiating a test sample in said sample receiving means;

digital electrical readout means and transducer means responsive to radiant energy received from an irradiated test sample;

a circuit board in said housing comprising analyzing circuit means common to a variety of sample analyses to be performed; for controlling said readout means; and circuit module means comprising circuit modules for selective connection with said circuit board and said analyzing circuit means for conditioning the parameters of said analyzing circuit means to a given analysis represented by a given module.

8. The invention defined in claim 7 wherein said console further includes an array of analyses selecting switches; and said circuit module means comprises a plurality of individual modules, one adjacent each of said switches interconnected with said circuit board and selectively interconnected through said switches to said common analyzing circuit means to normalize said common analyzing circuit means to a particular analysis to be performed.

9. The invention defined in claim 7 wherein said console further includes incubating means for receiving and storing a plurality of test samples.

10. Absorption photometer testing means for determining a particular constituent concentration in a liquid test sample irradiated by light of preselected wave length comprising;

a support provided with a cavity for receiving a liquid test sample having a light path therethrough;

detector means for receiving light transmitted along a single light path through said cavity with and without a liquid sample contained therein and for providing first and second current signals proportional to the intensity of said transmitted light through an open and sample containing cavity, respectively; amplifier means for receiving and converting said first current signal to a first output voltage representative of the light transmittance of the light open cavity at a first conversion gain and for receiving and converting said second current signal to a second output voltage representative of the light transmittance through said test sample at a second conversion gain, said gains having respective values such that said amplifier produces equal output voltages for said open cavity and for the presence of a standard sample reagent blank in said cavity in place of said test sample; !

converter means for receiving and converting said first and second output voltages to first and second time intervals, respectively, said time intervals being proportional to the respective logarithms of said first and second output voltages;

reference clock means;

counter means; and control means interconnected with said converter means, said reference clock means and said counter means for enabling said converter means to initiate said time intervals and for gating said clock means into said counter means at the beginning of and throughout said time intervals;

said control means including selecting means for constraining said counter to count to opposite directions over said first and second time intervals, and for subtracting one count from the other, whereby the difference in the said counts is representative of the said particular constituent concentration in said test sample.

11. The invention defined in claim 10, wherein said reference clock means comprises a variable frequency oscillator; and wherein said testing means further comprises correlating means for constraining said oscillator to a particular clock frequency for each particular constituent concentration test performed by said testing means.

12. The invention defined in claim 10, wherein said reference clock means comprises a variable frequency oscillator; and wherein said testing means further includes correlating means interconnected with said amplifier means and said reference clock means;

said correlating means for constraining said reference clock means to a predetermined frequency and for constraining the first said amplifier means to predetermine values of said first and second conversion gains for each particular constituent concentration test performed to normalize said testing means such that said counter means provides a count directly representative of the parameters of any given test.

13. The invention defined in claim 10, wherein said testing means further includes decoding and display means driven by said counter means and enabled by said control means to provide a digital readout of the resulting count in said counter means for each test performed.

14. The invention defined in claim 11, wherein said testing means further includes decoding and display means driven by said counter means and enabled by said control means to provide a digital readout of the resulting count in said counter means for each test performed.

15. The invention defined in claim 12, wherein said testing means further includes decoding and display means driven by said counter means and enabled by said control means to provide a digital readout of the resulting count in said counter means for each test performed.

16. Absorption photometer testing means for determining a particular constituent concentration in a liquid test sample irradiated by light of a preselected wavelength comprising:

a support provided with a cavity for receiving a liquid test sample having a light path therethrough;

detector means for receiving light transmitted through said cavity along a single light path with and without a liquid sample contained therein and for providing first and second current signals proportional to the intensity of said transmitted light through an open and sample containing cavity, respectively;

amplifier means for receiving and converting said first current signal to a first output voltage representative of the light transmittance of said open cavity at a first conversion gain and for receiving and converting said second current signal to a second output voltage representative of the light transmittance through said test sample at a second conversion gain, said gains having respective values such that said amplifier produces equal output voltages for said open cavity and for the presence of a standard sample reagent blank in said cavity in place of said test sample;

converter means for receiving and converting said first and second output voltages to first and second digital signals, respectively; and computer means for receiving and determining the difference in magnitude of said digital signals;

said difference representing the particular constituent concentration in said test sample.

17. The testing means defined in claim 16, wherein said converter means comprises linear-to-logarithmic converter means for converting said first and second output voltages to first and second digital outputs defining first and second time intervals proportional, respectively, to the logarithms of said first and second output voltages and the said input currents corresponding to the latter.

18. The invention defined in claim 17 wherein said testing means further includes display means for receiving and reading out said difference as a direct indication of constituent concentration.

19. The invention defined in claim 16 wherein said testing means further includes display means for receiving and reading out said difference as a direct indication of constituent concentration.

20. The invention defined in claim 18, wherein said console further includes incubating means for receiving and storing a plurality of test samples.

* * * * *